US012422359B2

(12) United States Patent
Schmitt et al.

(10) Patent No.: US 12,422,359 B2
(45) Date of Patent: Sep. 23, 2025

(54) TOMOGRAPHIC REFRACTIVE INDEX PROFILE EVALUATION OF NON-SYMMETRICAL GLASS FIBER PREFORMS AND FIBERS THEMSELVES

(71) Applicants: Heraeus Quartz North America LLC, Buford, GA (US); Heraeus Quarzglas GmbH & Co. KG, Hanau (DE)

(72) Inventors: Maximilian Schmitt, Buford, GA (US); Carl Ponader, Buford, GA (US)

(73) Assignees: HERAEUS QUARTZ NORTH AMERICA LLC, Bulford, GA (US); HERAEUS QUARZGLAS GMBH & CO. KG, Hanau (DE)

( * ) Notice: Subject to any disclaimer, the term of this patent is extended or adjusted under 35 U.S.C. 154(b) by 142 days.

(21) Appl. No.: 18/214,156

(22) Filed: Jun. 26, 2023

(65) Prior Publication Data
US 2024/0426750 A1 Dec. 26, 2024

(51) Int. Cl.
*G01N 21/41* (2006.01)
*G01N 21/39* (2006.01)
(Continued)

(52) U.S. Cl.
CPC ........... *G01N 21/412* (2013.01); *G01N 21/39* (2013.01); *G01N 21/4133* (2013.01);
(Continued)

(58) Field of Classification Search
CPC .. G01N 21/412; G01N 21/45; G01N 21/4133; G01N 21/4153; G01N 21/41;
(Continued)

(56) References Cited

U.S. PATENT DOCUMENTS 4,181,433 A * 1/1980 Marcuse .............. G01N 21/412
356/73.1
4,227,806 A 10/1980 Watkins
(Continued)

FOREIGN PATENT DOCUMENTS

CN 102981213 A * 3/2013 .......... G01M 11/338
CN 107110778 B * 1/2020 ............ G01M 11/37
(Continued)

OTHER PUBLICATIONS

Liu et al., "Mechanical artifacts in optical projection tomography: classification and automatic calibration," Optics Continuum, vol. 1, No. 12, pp. 2577-2589 (Dec. 15, 2022).
(Continued)

*Primary Examiner* — Michael P Stafira
(74) *Attorney, Agent, or Firm* — Panitch Schwarze Belisario & Nadel LLP

(57) ABSTRACT

A method for determining the refractive index profile of a preform when the RIP is not substantially symmetrical. (i) The preform is scanned, starting with a first projection angle, and raw data are created representing the object through measured data. (ii) Optionally, the object is rotated and step (i) repeated iteratively until all projection angles have been scanned and all measured data have been created. (iii) The measured data are processed to form a sinogram and, if the optional step (ii) has been completed, the method proceeds to step (v). (iv) The object is rotated and steps (i) and (iii) are repeated iteratively until all projection angles have been scanned. (v) A 2D RIP is calculated. (vi) A line section of interest is selected within the 2D RIP. (vii) A fitting procedure is applied to the line section of interest. (viii) Finally, refractive index steps/gradients and dimensions are determined.

15 Claims, 27 Drawing Sheets

(51) Int. Cl.
  *G01N 21/88*  (2006.01)
  *G01N 21/17*  (2006.01)
(52) U.S. Cl.
  CPC . *G01N 21/8851* (2013.01); *G01N 2021/1787* (2013.01); *G01N 2021/399* (2013.01); *G01N 2021/4153* (2013.01); *G01N 2021/4193* (2013.01); *G01N 2021/8887* (2013.01); *G01N 2201/0633* (2013.01); *G01N 2201/0813* (2013.01); *G01N 2201/104* (2013.01)
(58) Field of Classification Search
  CPC ........... G01N 21/3581; G01N 21/3586; G01N 21/1717; G01N 2201/088; G01N 3/30; G01N 21/23; G01N 15/1468; G01N 2021/3595; G01N 2021/4166; G01N 21/43; G01N 15/1433; G01N 15/1434; G01N 2021/1787; G01N 2021/399; G01N 2021/4193; G01N 2021/8887; G01N 21/255; G01N 21/274; G01N 21/31; G01N 21/39; G01N 21/8851; G01N 21/896; G01N 2201/0633; G01N 2201/0634; G01N 2201/0813; G01N 2201/0826; G01N 2201/104; G01N 2201/127; G01N 2021/0342; G01N 21/4795; G01N 21/552; G01N 23/083; G01N 15/1484; G01N 2015/1445; G01N 2021/1725; G01N 2021/1731; G01N 2021/1757; G01N 2021/9511; G01N 21/01; G01N 21/53; G01N 21/55; G01N 21/64; G01N 21/7703; G01N 21/952; G01N 21/00; G01N 23/02; G01N 33/386; G01N 2021/0112; G01N 2021/3568; G01N 2021/4173; G01N 2021/458; G01N 2021/646; G01N 2021/9544; G01N 21/3563; G01N 21/59; G01N 21/6489; G01N 21/84; G01N 21/8901; G01N 21/892; G01N 21/954; G01N 2223/1016; G01N 23/04; G01N 33/388; G01N 33/48; G01N 33/50; G01N 9/00; G01N 9/24; G01N 2021/4153; G01N 2021/4126; G01N 2021/434
  See application file for complete search history.

(56) References Cited

U.S. PATENT DOCUMENTS

| | | | | |
|---|---|---|---|---|
| 4,362,943 | A * | 12/1982 | Presby | G01M 11/37 356/73.1 |
| 4,441,811 | A * | 4/1984 | Melezoglu | G01N 21/412 356/73.1 |
| 4,515,475 | A | 5/1985 | Payne et al. | |
| 4,744,654 | A | 5/1988 | Jinno et al. | |
| 5,078,488 | A | 1/1992 | Yamaguchi et al. | |
| 5,463,466 | A | 10/1995 | Svendsen | |
| 7,352,474 | B2 | 4/2008 | Bachim et al. | |
| 8,013,985 | B2 | 9/2011 | Cook | |
| 8,405,836 | B2 | 3/2013 | Yablon | |
| 9,395,267 | B2 | 7/2016 | Yablon | |
| 10,168,139 | B2 | 1/2019 | Yablon | |
| 10,508,973 | B2 | 12/2019 | Schmitt et al. | |
| 12,085,506 | B2 | 9/2024 | Schmitt | |
| 2004/0028360 | A1* | 2/2004 | Pleunis | G02B 6/0288 385/144 |
| 2016/0123873 | A1* | 5/2016 | Cook | G01N 21/412 356/73.1 |
| 2018/0113052 | A1* | 4/2018 | Schmitt | G02B 6/0365 |
| 2022/0276124 | A1* | 9/2022 | Schmitt | G01M 11/30 |
| 2024/0254032 | A1 | 8/2024 | Takano et al. | |

FOREIGN PATENT DOCUMENTS

| | | | | |
|---|---|---|---|---|
| EP | 0174708 | A2 * | 3/1985 | |
| EP | 0528880 | B1 | 8/1997 | |
| EP | 3315948 | A1 | 5/2018 | |
| EP | 4016052 | A1 * | 6/2022 | ........ G01M 11/0214 |
| JP | S57042835 | A | 3/1982 | |
| JP | H08304229 | A | 11/1996 | |
| JP | 2003185532 | A * | 7/2003 | |
| JP | 2003185533 | A * | 7/2003 | |
| JP | 2004170262 | A * | 6/2004 | |
| JP | 2018077220 | A | 5/2018 | |
| JP | 2021156761 | A | 10/2021 | |
| JP | 2023521000 | A | 5/2023 | |
| WO | 2022254986 | A1 | 12/2022 | |

OTHER PUBLICATIONS

Y. Zhao et al., "Nondestructive Measurement for Arbitrary RIP Distribution of Optical Fiber Preforms," Journal of Lightwave Technology, vol. 22, No. 2, pp. 478-486 (2004).
M. Hutsel et al., "Concurrent Three-Dimensional Characterization of the Refractive-Index and Residual-Stress Distributions in Optical 30 Fibers," Applied Optics, vol. 51, No. 22, pp. 5442-5452 (2012).
A. Novozámský et al., "Tomography Reconstruction of Geometry and Refractive Index Profile of Highly Asymmetric Optical Fiber Preforms," Proc. SPIE, vol. 7746, pp. 77461O-1-77461O-6 (2010).
Y. Zhao et al., "Tomographic Reconstruction of Arbitrary Refractive Index Distribution of Optical Fibre Preforms," Symposium on Optical Fiber Measurements, pp. 51-54 (2004).
Y. Zhao et al., "Nondestructive Measurement of Refractive Index Profile for Holey Fiber Preforms," Optics Express, vol. 11, No. 20, pp. 2474-2479, (2003).
P. L. Chu et al., "Nondestructive Determination of Refractive Index Profile of an Optical Fiber: Fast Fourier Transform Method," Applied Optics, vol. 18, No. 7, pp. 1117-1122 (1979).
K. Toga et al., "Microscopic Computer Tomography Measurement of Nonaxisymmetrically Distributed Optical Fiber Refractive Index," Journal of Lightwave Technology, vol. 6, No. 1, pp. 73-79, Jan. 1, 1988.
B. Bachim et al., "Microinterferometric Optical Phase Tomography for Measuring Small, Asymmetric Refractive-Index Differences in the Profiles of Optical Fibers and Fiber Devices," Applied Optics, vol. 44, No. 3, pp. 316-327, Jan. 20, 2005.
Glantschnig et al., "Index Profile Reconstruction of Fiber Preforms from Data Containing a Surface Refraction Component," Applied Optics, vol. 29, No. 19, pp. 2899-2907 (1990).
Office Action issued Feb. 25, 2025 in JP Application No. 2024093947.

* cited by examiner

TOMOGRAPHIC REFRACTIVE INDEX PROFILE EVALUATION OF NON-SYMMETRICAL GLASS FIBER PREFORMS AND FIBERS THEMSELVES

FIELD

The present disclosure relates generally to refractive index measurements and, more particularly, to methods of measuring the refractive index profile of a transparent cylindrical object such as a fiber preform.

BACKGROUND

Transparent cylindrical objects, such as fiber preforms, optical fibers, light pipes, light tubes, and the like are used in a variety of optical applications. In many instances, it is desirable to know the refractive index profile (RIP) of such objects. For example, optical fibers are formed by heating a fiber preform and drawing the molten end into a thin glass thread. The RIP of the preform defines the RIP of the resulting optical fiber, which in turn determines the waveguiding properties of the optical fiber. It is thus important to be able to accurately measure the RIP of the fiber preform.

Various methods exist for determining a radial RIP of a cylindrical optical object, particularly a preform for an optical fiber. The cylinder optical object often has a cylinder longitudinal axis around which at least one layer k with a layer radius $r_k$ and with a layer refractive index $n_k$ may extend radially, symmetrically about an axis, and uniformly. Of course, many objects having non-radial, non-symmetric, or gradient RIP also exist and the present disclosure focuses on objects with a non-symmetric RIP. A deflection angle distribution $\psi(\rho, \theta)$ is measured and the RIP is reconstructed from the deflection angle distribution (where $\rho$ is scanning position and $\theta$ is the measured projection angle). The RIP is also known as the refractive index distribution, represented by the symbol $n(x, y)$, where x and y are Cartesian coordinates.

A Cartesian coordinate system specifies each point uniquely in three-dimensional space by three Cartesian numerical coordinates (x, y, z), which are the signed distances to the point from three, fixed, mutually perpendicular directed lines, measured in the same unit of length. Each reference line is called a coordinate axis or just an axis of the system, and the point where they meet is its origin, usually at ordered triplet (0, 0, 0). The coordinates can also be defined as the positions of the perpendicular projections of the point onto the three axes, expressed as signed distances from the origin.

Unfortunately, the refractive index distribution cannot be measured directly. The refractive index distribution is normally determined indirectly as a deflection or interference of a light beam which is transmitted through a volume region of the optical element, the stepwise transmission of the light beam relative to the optical element is called "scanning" and is in the direction of $\rho$. The spatial refractive index distribution in the optical element can be inferred from the interference or the deflection of the exiting light beam (exit beam) based on the beam direction at the beam entrance point (entry beam). The family of the deflection angles $\psi$ measured during scanning of the light beam for a single, fixed projection angle $\theta$ in a direction transverse to the longitudinal axis (in the $\rho$-direction) forms the deflection angle distribution $\psi(\rho, \theta)$ (where $\theta$ is fixed).

For a better view and illustration, the geometric relationships are schematically shown in FIG. 1. Depicted is an object with a homogeneous refractive index $n_1$ surrounded by an index adjustment fluid with a refractive index $n_0$ such that $n_0 < n_1$. The radius of the object is $r_1$. The deflection angle $\psi$ is defined as the angle between the exit beam and the entry beam, and y is defined as the distance between the cylinder longitudinal axis and the entry point of the entry beam. When scanning the object, the beam is refracted as soon as it contacts the object and is directed toward the center of the object. The shortest distance of the beam to the center of the object is given by the radius r*, which appears in the formulation of the numerical integration later on (which is often in literature called the inverse Abel transformation).

For axially symmetric objects with a fully step-like index distribution of the refractive index, the deflection angle distribution $\psi(y)$ can be described mathematically with reference to the following Equation (1):

$$\Psi_m(y) = \begin{cases} 2 \cdot \sum_{j=1}^{m} \sum_{k=1}^{j} \left[ \arcsin\left(\frac{y}{r_k} \cdot \frac{n_0}{n_{k-1}}\right) - \arcsin\left(\frac{y}{r_k} \cdot \frac{n_0}{n_k}\right) \right], & \text{for } r_{j+1} \cdot \frac{n_{j+1}}{n_0}, \\ & r_{j+1} \cdot \frac{n_j}{n_0} \le |y| < r_j \cdot \frac{n_j}{n_0} \\ 2 \cdot \sum_{j=1}^{m} \sum_{k=1}^{j} \left[ \arcsin\left(\frac{y}{r_k} \cdot \frac{n_0}{n_{k-1}}\right) - \arcsin\left(\frac{y}{r_k} \cdot \frac{n_0}{n_k}\right) \right] + 2 \cdot \arccos\left(\frac{y}{r_j} \cdot \frac{n_0}{n_{j-1}}\right), & \text{for } r_{j+1} \cdot \frac{n_{j+1}}{n_0} \le \\ & |y| < r_{j+1} \cdot \frac{n_j}{n_0} \\ 0, & \text{for } |y| < r_j \end{cases}$$

In Equation (1), m is the number of the layers of the object, $n_0$ is the refractive index of the surrounding medium, $n_k$ is the refractive index of the k-th layer, and $r_k$ is the radius of the k-th layer. A known mathematical method for calculating the refractive index profile from the deflection angle distribution based on measurement data according to Equation (1) is based on a well-known numerical integration (called the "inverse Abel transformation" in the literature) which is calculated from Equation (2) below $$n[r(y)] = n_0 \cdot \exp\left(\frac{1}{\pi} \cdot \int_y^R \frac{\Psi(t) dt}{\sqrt{t^2 - y^2}}\right)$$

where r is the shortest distance from the cylinder longitudinal axis of the object to the beam path, namely, as defined in Equation (3)

$$r(y) = y \cdot \exp\left(-\frac{1}{\pi} \cdot \int_y^R \frac{\Psi(t) dt}{\sqrt{t^2 - y^2}}\right)$$

and R is the reference point for the refractive index distribution, namely the radial position of the reference refractive index (atmosphere, index adjustment fluid, or a reference glass plate surrounding the object). By applying the partial derivative of $\psi$ from the location $\Delta t$ the formulation becomes the shape of the inverse Abel transformation well-known in mathematics. In principle, the inverse Abel transformation can be applied to any kind of deflection angle distribution of an axially symmetric RIP, not just the ideal of a step index-like distribution as reflected in Equation (1).

U.S. Pat. No. 4,227,806 describes a method for non-destructively determining parameters of an optical fiber preform. The preform is scanned by a laser beam entering transversely into the core-cladding structure, and the deflection angle of the exiting beam is measured and subsequently compared to theoretical or empirical deflection angle distributions of preforms whose refractive index distribution is known. During measurement, the preform is positioned in a bath containing an index adjustment fluid so as to prevent the deflection angle from becoming too large.

U.S. Pat. No. 4,441,811 describes a method and an apparatus for determining the refractive index distribution of a cylindrical, transparent optical preform. In this case, too, the preform which is inserted in an index adjustment fluid is scanned by a transversely entering light beam that extends perpendicular to the optical axis. The light beam is deflected by the glass of the preform and imaged with an optical device onto a positionable detector. The refractive index profile is calculated from the deflection angle distribution using numerical integration. Other preform parameters, such as preform diameter, core diameter, eccentricity, and CCDR value (cladding-to-core diameter ratio) can also be determined from the reconstructed RIP.

Tomography is imaging by sections or sectioning through the use of any kind of penetrating wave (such as a light wave). The use of computed tomography (CT) to determine the RIP of optical fiber preforms is well known. See, for example, Y. Zhao et al., "Nondestructive Measurement for Arbitrary RIP Distribution of Optical Fiber Preforms," Journal of Lightwave Technology, Vol. 22, No. 2, pages 478-86 (2004); Y. Zhao et al., "Nondestructive Measurement of Refractive Index Profile for Holey Fiber Preforms," Optics Express, Vol. 11, No. 20, pages 2474-79 (2003); Y. Zhao et al., "Tomographic Reconstruction for Arbitrary Refractive Index Distribution of Optical Fibre Preforms," Symposium on Optical Fiber Measurements, at 51-54 (2004); and A. Novozámský, "Tomography Reconstruction of Geometry and Refractive Index Profile of Highly Asymmetric Optical Fiber Preforms," Proc. SPIE, Vol. 7746, pages 77461O-1-77461O-6 (2010).

Methods for the reconstruction of the RIP from the transversely measured deflection angle distribution by using the inverse Abel transformation can be found in U.S. Pat. Nos. 4,744,654, 5,078,488, and 4,515,475. The following technical articles describe methods that use the inverse Radon transformation: Michael R. Hutsel and Thomas K. Gaylord, "Concurrent three-dimensional characterization of the refractive-index and residual-stress distributions in optical fibers," Applied Optics, Vol. 51, No. 22, pages 5442-52 (2012), and S. Fleming et al., "Nondestructive Measurement for Arbitrary RIP Distribution of Optical Fiber Preforms," Journal of Lightwave Technology, Vol. 22, No. 2, pages 478-86 (2004).

P. Chu et al., "Nondestructive Determination of Refractive Index Profile of an Optical Fiber: Fast Fourier Transform Method," Applied Optics, Vol. 18, No. 7, pages 1117-22 (1979) (incorporated by reference in this document), presents another method which makes use of the fringe pattern. This method uses Fast Fourier Transform (FFT) to solve the inverse Abel transformation and convert the path lengths into an index profile. The advantage of the FFT method is that it can expedite calculations.

The simple reconstruction of the RIP or refractive index profile n(r) (for symmetrical cases) or n(x, y) (for non-symmetrical cases) from the transversely measured deflection angle distribution using either the inverse Abel transformation or the inverse Radon transformation does not lead, however, to negligible differences with respect to the real RIP. One reason for this error is a known measurement artifact that occurs in refractive index discontinuities on boundaries between the transparent object and the environment or on the boundary between radial refractive index steps. Measurements taken on the boundaries of refractive index jumps from a low to a high refractive index (when viewed from the outside to the inside) in a near-boundary volume region of the optical object lead to a region that can in principle not be illuminated or characterized. The occurrence of a non-measurable region caused by the measuring method in the case of an upward refractive index jump is typical of optical fibers with a comparatively higher refractive index in the core than in the inner cladding layer.

The error source is illustrated in the sketch of FIG. 2 by reference to a simple case, namely a rod with a homogeneous refractive index distribution $n_1$, which is inserted into an index adjustment fluid (also called an index adaptation liquid or an immersion liquid) with a refractive index number $n_0$, where $n_0$ is less than $n_1$. During scanning of the rod, the beam which impinges tangentially at the entry point is refracted towards the center of the rod and exits as an exit beam with a different propagation direction from the rod, resulting in a beam path as shown in FIG. 2. Accordingly, there is an area or region in the object through which no light beam can be transmitted tangentially (i.e., that is never illuminated by the beam during measurement). This area is shown as shaded in FIG. 2 and marked at a radius r* and at an angle β (beta), with the angle $\beta=90°-\psi/2$. As a consequence, it is not possible to measure deflection angles in the region $r^*<r<r_1$, and it becomes apparent that due to this measurement error the reconstructed refractive index value is lower than the real refractive index.

Typical differences and errors of the reconstructed RIP, for instance, of step index profiles are roundings of the profile and step heights that are too small. The publication by Werner J. Glantschnig, "Index profile reconstruction of fiber preforms from data containing a surface refraction component," Applied Optics, Vol. 29, No. 19, pages 2899-2907 (1990) ("the Glantschnig publication," which is incorporated by reference in this document), is one publication that addresses the problems posed by the non-measurable region. Glantschnig suggests that, by way of interpolation based on the inner three measuring points of the deflection angle distribution directly before the discontinuity, the actually missing deflection angles can be inferred in the non-measureable region.

The interpolation based on three measuring points does not always produce good results. Thus, some of the methods of measuring a RIP cannot provide an accurate measurement of the RIP of a simple homogeneous rod. One reason for this shortcoming is that there is a refractive index discontinuity at the boundary, or edge, of the rod. The Glantschnig publication explains the reasons why a refractive index discontinuity is not accurately reconstructed from the deflection function data. Although the Glantschnig publication proposes a method for measuring the RIP, it requires measuring the deflection angle precisely at the edge of the object, which is difficult to the point of impracticality.

To solve these problems, U.S. Pat. No. 8,013,985 issued to Corning Incorporated (which is incorporated by reference in this document) suggests a modification of this reconstruction method. For the measurement of the RIP of a transparent cylindrical object such as a fiber preform, a beam deflection angle function is measured. An estimated RIP that is representative of the real RIP is adapted by a numerical model to the measured deflection angle distribution. In the measurement, the fiber preform to be measured is arranged between a laser and a transform lens. The preform has a central axis and a cylinder surface that define a preform radius R. The entry beam impinging on the cylinder surface at a height x is deflected in the preform and exits again as an exit beam at another angle, which is detected by a photodetector and processed by a controller. The deflection angle is defined as the angle between the exit beam and the entry beam and is changed by varying the laser beam height x, and the deflection angle distribution is measured.

To this end, a symmetry correlation is completed on the measured deflection function to define a center coordinate. The measured deflection function is split into two halves about the center coordinate, and a refractive index half-profile is obtained for each of the two halves to yield a resulting estimated index profile for each half. The relevant parameters for the RIP calculation are the preform radii $r_k$ and the refractive index of the layers $n_k$. A target angle distribution $\psi_t$ is iteratively adapted to the measured deflection function, with measurement points close to a boundary (refractive index discontinuity) being omitted within or on the edge of the preform. This method of the arithmetical iterative adaptation of mathematical functions can be called "fitting."

According to U.S. Pat. No. 8,013,985, fitting is conducted in that the above Equation (1) (however without consideration of the arccos portion indicated in the second line of the equation) has inserted into the Equation yet unknown parameters of the RIP, namely a value for the preform radius R (or for the radius of the refractive index discontinuity), as well as yet unknown refractive index values, wherein the yet unknown parameters are varied such that the obtained target angle distribution $\psi_t$ best matches the measured deflection angle distribution $\psi_m$. The target angle distribution is thus adapted (fitted) with the yet unknown parameters to the measured deflection angle distribution.

On the basis of the thus adapted, simulated target angle distribution, a reconstructed refractive index profile is derived. This profile extends up to the reconstructed preform radius R* which is greater than the radius of the inner object region. For cylindrical objects whose RIP has at least one discontinuity, the method is applied to the various object regions which are respectively defined by the discontinuity.

In this method, a simulated target angle distribution $\psi_t$ is adapted to the measured deflection angle distribution $\psi_m$ by fitting yet unknown parameters, and a radial refractive index distribution which can extend up to the boundary of a further externally located discontinuity of the refractive index profile is derived from the simulated target angle distribution.

The detection of a complete RIP of an optical object having several layers radially separated by a refractive index discontinuity therefore requires a successive measurement, calculation, and estimation of the layers defined by the respective discontinuity from the outside to the inside. Systematic and numerical errors may result in the fitting of the simulated target angle distribution. In addition, it has been found that the comparison of deflection angle distributions, namely a simulated one and a measured one, is not very illustrative and requires a high degree of expertise for determining whether and optionally how a fitting is optimal, or whether and optionally which value requires a post-correction or further variation.

Like the '985 patent, U.S. Pat. No. 10,508,973, issued to the assignee of the present application (Heraeus Quarzglas GmbH & Co. KG of Hanau, Germany) and incorporated by reference in this document, discloses a fitting procedure for axially symmetrical preforms. The '973 patent teaches a method for determining the refractive index profile of a cylindrical optical object, particularly a preform for an optical fiber. The method involves: (a) preparing the measured deflection angle distribution, including an extreme value determination of the deflection angle distribution, to obtain a prepared deflection angle distribution; (b) transforming the prepared deflection angle distribution into a prepared refractive index profile; (c) evaluating the prepared refractive index profile for the fixation of orientation values for the layer radius and for the layer refractive index of a hypothetical refractive index profile; (d) generating a simulated deflection angle distribution on the basis of the hypothetical refractive index profile with the orientation values, and transforming the deflection angle distribution into a simulated refractive index profile; (e) fitting the simulated refractive index profile to the prepared refractive index profile by iterative adaptation of parameters to obtain a fitted, simulated refractive index profile which is defined by adapted parameters; and (f) obtaining the refractive index profile as the hypothetical refractive index profile with the adapted parameters. The method represents the state-of-the-art with respect to determining the RIP when the RIP is substantially or completely step-index like.

The state-of-the-art methods suffer from at least one of two errors. The first type of error is RIP measurement artifact. All reconstructed profiles (including tomographic reconstructed two dimensional or 2D RIPs) have the typical profiling measurement artifact (underestimated refractive index steps, distorted profile, rounded edges, and the like), so that an accurate evaluation is not possible. The second type of error is systematic error due to non-symmetry. Ignoring the non-symmetry of nearly symmetrical preforms by simply fitting a symmetrical distribution (which is usually able to handle the measurement artifact in symmetrical cases) results in massive systematic error.

A need remains, therefore, for a method for determining the RIP of a cylindrical transparent object without an axially symmetric or approximately axially symmetric refractive index distribution. The RIP may or may not be substantially or completely step-index like. There is also a need for a method that minimizes measurement artifact error. Of course, the method must also be improved in terms of plausibility, accuracy, reliability, and reproducibility. A related need is for a method that improves preform assembly and meets the demands of preform customers, especially for preforms of increasingly more complex designs.

SUMMARY

To meet these and other needs, and in view of its purposes, the present disclosure provides a method for determining the refractive index profile of an object such as a preform especially when the RIP is not substantially symmetrical. The method includes the following steps: (a) providing the object, the object including an optical object which has a longitudinal axis around which at least one layer extends outwardly wherein the at least one layer lacks a complete rotational symmetry in cross section; (b) scanning the object with a light beam, starting with a first projection angle, and creating raw data representing the object through measured data; (c) optionally rotating the object and repeating step (b) iteratively until all projection angles have been scanned and all measured data have been created; (d) processing the measured data to form a sinogram and, if the optional step (c) has been completed, proceeding to step (f); (e) rotating the object and repeating steps (b) and (d) iteratively until all projection angles have been scanned; (f) calculating a 2D RIP; (g) selecting a line section of interest within the 2D RIP; (h) applying a fitting procedure to the line section of interest; and (i) determining refractive index steps/gradients and dimensions.

It is to be understood that both the foregoing general description and the following detailed description are exemplary, but are not restrictive, of the disclosure.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 13 is the sinogram created by the method;

FIG. 14 is a diagram of the relative refractive index n(x, y)−1.446 in the x-y plane, illustrating the reconstructed 2D RIP of the preform having a single elliptical core;

FIG. 15 is a graph illustrating the line section fitting procedure for data taken along a line section drawn through the core of the diagram of FIG. 14;

FIG. 16 is a graph of the relative refractive index n(x, y)−1.446 against the position r in millimeters, for the preform having a single elliptical core, and compares two different line sections and single versus tomographic measurements;

FIG. 17 is the sinogram created by the method;

FIG. 18 is a diagram of the relative refractive index n(x, y)−1.446 in the x-y plane, illustrating the reconstructed 2D RIP of the preform having a single core with an octagonal-shaped cladding;

FIG. 19 is a graph illustrating the line section fitting procedure for data taken along a first line section drawn through the core of the diagram of FIG. 18;

FIG. 20 is a graph illustrating the line section fitting procedure for data taken along a second line section drawn through the core of the diagram of FIG. 18;

FIG. 21 is the sinogram created by the method;

FIG. 22 is a diagram of the relative refractive index n(x, y)−1.4587 in the x-y plane, illustrating the reconstructed 2D RIP of the preform having seven cores;

FIG. 23 is a graph illustrating the line section fitting procedure for data taken along a first line section drawn through the center core of the diagram of FIG. 22;

FIG. 24 is a graph illustrating the line section fitting procedure for data taken along a second line section drawn through the center core of the diagram of FIG. 22;

FIG. 25 is the sinogram created by the method;

FIG. 26 is a diagram of the relative refractive index n(x, y)−1.4587 in the x-y plane, illustrating the reconstructed 2D RIP of the preform having six cores;

FIG. 27 is a graph illustrating the line section fitting procedure for data taken along a line section drawn through a first core of the diagram of FIG. 26; and FIG. 28 is a graph illustrating the line section fitting procedure for data taken along a line section drawn through another core of the diagram of FIG. 26.

DETAILED DESCRIPTION

Figure 1:
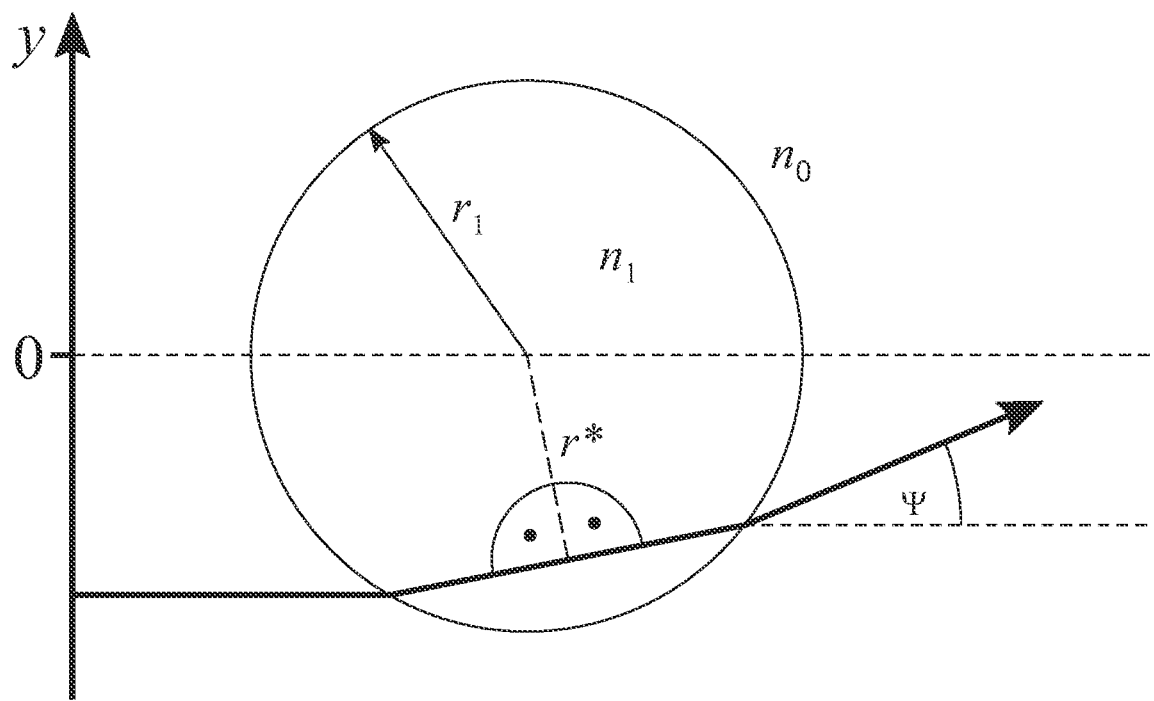
FIG. 1 shows the radiation path through an object with a homogeneous refractive index distribution illustrating various geometric relationships schematically.
Figure 2:
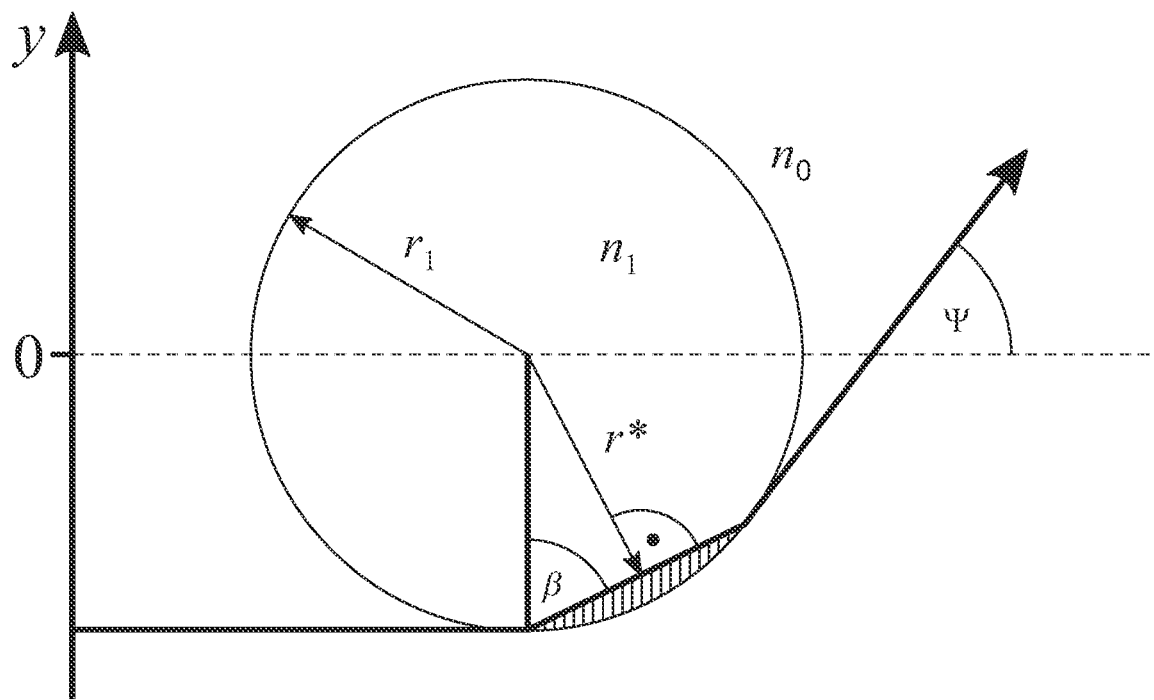
FIG. 2 shows the radiation path through an object with a homogeneous refractive index distribution illustrating the measurement artifact in refractive index profiling due to the shaded non-measurable region where no tangential radiation can be detected.

In this specification and in the claims that follow, reference will be made to a number of terms which shall be defined to have the following meanings ascribed to them. "Include," "includes," "including," "have," "has," "having," "comprise," "comprises," "comprising," or like terms mean encompassing but not limited to, that is, inclusive and not exclusive. The term "substantially," as used in this document, is a descriptive term that denotes approximation and means "considerable in extent" or "largely but not wholly that which is specified" and is intended to avoid a strict numerical boundary to the specified parameter.

The term "about" (or "approximately") means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is described to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point. Whether or not a numerical value or end-point of a range in the specification recites "about," the numerical value or end-point of a range is intended to include two embodiments: one modified by "about" and one not modified by "about." It will be further understood that the end-points of each of the ranges are significant both in relation to the other end-point and independently of the other end-point.

The term "about" further references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described.

The indefinite article "a" or "an" and its corresponding definite article "the" as used in this disclosure means at least one, or one or more, unless specified otherwise. Directional terms as used in this disclosure—for example up, down, right, left, front, back, top, bottom—are made only with reference to the figures as drawn and the coordinate axis provided with those figures and are not intended to imply absolute orientation.

The use of computed tomography (CT) to determine the refractive index profile (RIP) of optical fiber preforms is well known. The variables applicable to determining the RIP using CT are defined by the illustration provided in FIG. 3. Depicted is an object with a refractive index distribution n(x, y) surrounded by an index adjustment fluid with a refractive index $n_0$ such that $n_0 < n(x, y)$. The Cartesian coordinates x and y belong to the physical object (e.g., a glass body). When scanning the object, the beam is refracted as soon as it contacts the object and is directed toward the center of the object along the path shown with an arrow. The deflection angle ψ is defined as the angle between the exit beam and the entry beam.

During CT, the object is rotated. The mechanism (typically a rotational stage) to hold and rotate the sample is for simplicity not shown in FIG. 4. Tomography requires, however, an accurate way to rotate the sample. Although manual rotation is possible, it is impractical. An electrically driven rotational stage with an encoder is more suitable.

Rotation of the object through an angle θ, called the projection angle, leads to the Cartesian coordinate axes x' and y'. The scanning procedure takes place along the scanning position ρ in the direction of y'. For a given and fixed projection angle, such scanning leads to a measured deflection angle ψ(ρ, θ=fixed). It is necessary to measure the deflection angle distribution ψ(ρ, θ) for a large set of projection angles θ to determine an accurate RIP. Thus, the deflection angle distribution ψ(ρ, θ) is measured and the RIP is reconstructed from the deflection angle distribution (where ρ is scanning position and θ is the measured projection angle).

Figure 4:
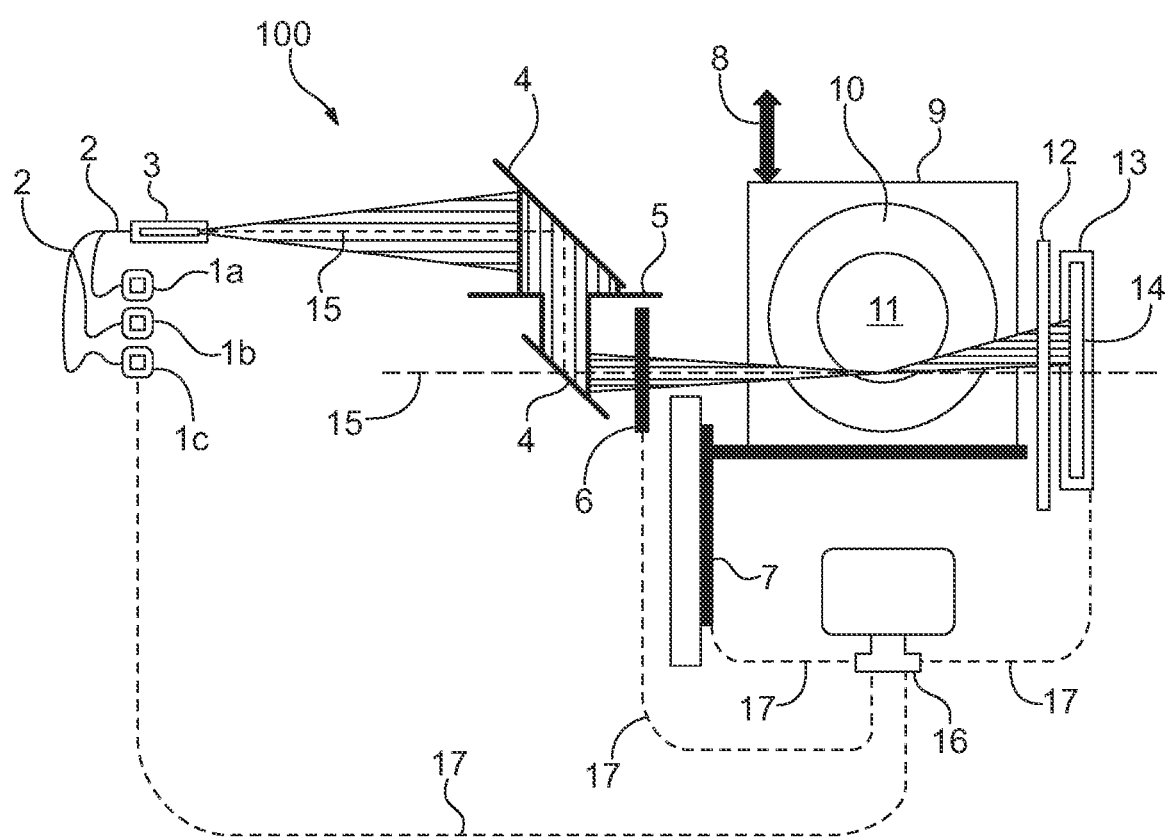
FIG. 4 is a schematic illustration of a deflection function measurement system.

The description of the present methods follows with reference to a transparent cylindrical object in the form of a fiber preform. It will be understood by a person skilled in the art, however, that the methods described can be applied generally to any cylindrical object having a refractive index at a given wavelength of radiation, where the corresponding deflection angle distribution can be measured via transverse transmission of the radiation of a wavelength and a target deflection angle distribution function exists that can be expressed as a function which can be fitted to the measured data. Referring now to the drawing, in which like reference numbers refer to like elements throughout the various figures that comprise the drawing, FIG. 4 is a schematic diagram illustrating an example embodiment of a basic deflection angle distribution measurement system 100 that can be used to establish the measured deflection angle distribution function. The deflection angle is calculated by the equation: ψ=arctan(projection on camera/distance to camera).

The system 100 has a pair of optical axes 15 and a third optical axis (not shown) between a pair of off-axis mirrors 4. One or more laser sources (such as laser diodes 1a, 1b, and 1c) each generate a laser beam (or "light beam") and provides or provide the laser beam or beams to one or more beam combiner fibers 2 which delivers or deliver the laser beam or beams to a beam conditioner 3. (In fiber-optic communication, a single-mode optical fiber is an optical fiber designed to carry only a single mode of light: the transverse mode. The standard G.652 defines the most widely used form of single-mode optical fiber.) The one or more beam combiner fibers 2 are either Y-shaped fibers, with two inputs and one output, or X-shaped fibers with cross talk in the spliced region. The beam conditioner 3 is aligned along the first optical axis 15 and alters the properties of the laser beam. The beam emitted by the beam conditioner 3 travels along the first optical axis 15 and engages an off-axis parabolic reflector having the pair of mirrors 4 and an aperture (or "pin hole") 5. The first mirror 4 creates parallel beams which pass through the aperture 5; the second mirror 4 focuses those beams along the second optical axis 15.

The focused beams that reflect from the second mirror 4 of the off-axis parabolic reflector pass through an optical shutter 6 and enter a measuring cell 9. As long as the control voltage to the shutter 6 remains high, the shutter 6 stays open. As soon as the voltage goes low, however, the shutter 6 closes, providing inherent "fail-safe" operation, i.e., security.

The measuring cell 9 has opposite sides that are planar and at right-angles to the second optical axis 15. Arranged in the measuring cell 9 is a transparent cylindrical object 11 having a homogeneous or a stepped RIP to be measured, typically in the form of a fiber preform having a core with a higher refractive index surrounded by at least one cladding layer with a lower refractive index. Surrounding the object 11 in the measuring cell 9 is an index adjustment fluid 10. In an example embodiment, the index adjustment fluid 10 is an oil with a refractive index that is close to, but not the same as, the refractive index of the object 11. For simplicity, however, the refractive index of the index adjustment fluid 10 matches the measuring cell 9 so that no additional deflections—at the entry and exit point—occur in the embodiment illustrated.

As an alternative to the widely and commonly used paraffin RI index-matching oils, a glycerol-water-mixture can also be used. The mixing ratio permits relatively easy and accurate adjustment or tuning of the RI to the desired RI level within the range of 1.333 (water RI) and 1.48 (glycerol RI).

The laser beam enters the measuring cell 9 and is first incident on the object 11 at a first edge of the object 11 and undergoes a first refraction. The first-refracted laser beam then travels through the object 11 and exits the object 11 on the opposite edge, where it undergoes a second refraction and exits the object 11. The deflection angle, identified by the Greek letter ψ (psi), is defined by the angle of the exit laser beam relative to the incident laser beam. The exit laser beam then passes through a filter (e.g., an infrared long pass filter) 12 and is detected by a photodetector unit. The filter 12 helps to preclude environmental light from adversely impacting measurements. A suitable photodetector unit includes a line scan camera 13 having an optically active sensor 14. (Alternatives to the line scan camera could also be used. Among other suitable cameras are 2D cameras and time delay integration or "TDI" line scan cameras. The TDI line scan camera is somewhat a hybrid: it is a 2D sensor with, for example, 16,384×256 pixels, but its architecture and the sensor extend in one dimension more like a line-scan camera.) The photodetector unit then sends a corresponding detector signal to a controller 16 via data connections 17 for processing.

The measuring cell 9 is mounted on a linear stage 7 configured both to support the measuring cell 9 and to move the measuring cell 9 in movement directions 8 (e.g., up and down as shown in FIG. 4). By performing measurements of the deflection angle over a range of laser beam heights relative to the central horizontal axis of the measuring cell 9 and the object 11 in the measuring cell 9, the corresponding detector signals received and processed by the controller 16 create the measured deflection angle as described in greater detail below. In other words, the movement of the linear stage 7 allows for the laser beam height to be varied relative to the measuring cell 9 and the object 11 so that the measured deflection function includes a range of radii of the object 11. It is possible, of course, to move the camera relative to the laser beam so that the camera remains aligned with the laser beam as well as vice versa.

Although in the embodiment illustrated in FIG. 4 the object 11 in the measuring cell 9 is moved (e.g., scanned), in another embodiment other components (such as the laser diodes 1a, 1b, and 1c and the photodetector unit) can all be simultaneously moved (e.g., scanned) relative to the object 11 (which is held stationary) so that the laser beam height can be varied in order to send the laser beam through different parts of the object 11.

The controller 16 is, for example, a computer that includes a processor unit (e.g., a CPU), a memory unit, and support circuitry all operably interconnected. The processor may be or include any form of a general-purpose computer processor that can be used in an industrial setting. The memory unit includes a computer-readable medium capable of storing instructions (e.g., software) that direct the processor to carry out the methods as described in detail below. The memory unit may be, for example, random-access memory, read-only memory, floppy or hard disk drive, or other form of digital storage. In an example embodiment, the instructions stored in the memory unit are in the form of software that, when executed by the processor, transform the processor into a specific-purpose processor that controls (i.e., directs or causes) the system 100 to carry out one or more of the methods described below. The support circuitry is operably (e.g., electrically) coupled to the processor and may include cache, clock circuits, input/output sub-systems, power supplies, control circuits, and the like.

The laser diodes 1a, 1b, and 1c; the shutter 6; the linear stage 7; and the line scan camera 13 are each configured to send signals and data to, and receive signals and data from, the controller 16 along a plurality of data connections 17. The data connections 17 may be wired or wireless; any conventional data connections 17 as would be known to an artisan are suitable.

Many other deflection function measurement systems similar to those described above can be used to obtain the deflection function. Regardless of the system used, a number of methods for determining the RIP of the cylindrical optical object 11 are possible. The deflection angle is calculated by the equation: ψ=arctan(projection on camera/distance to camera).

Figure 3:
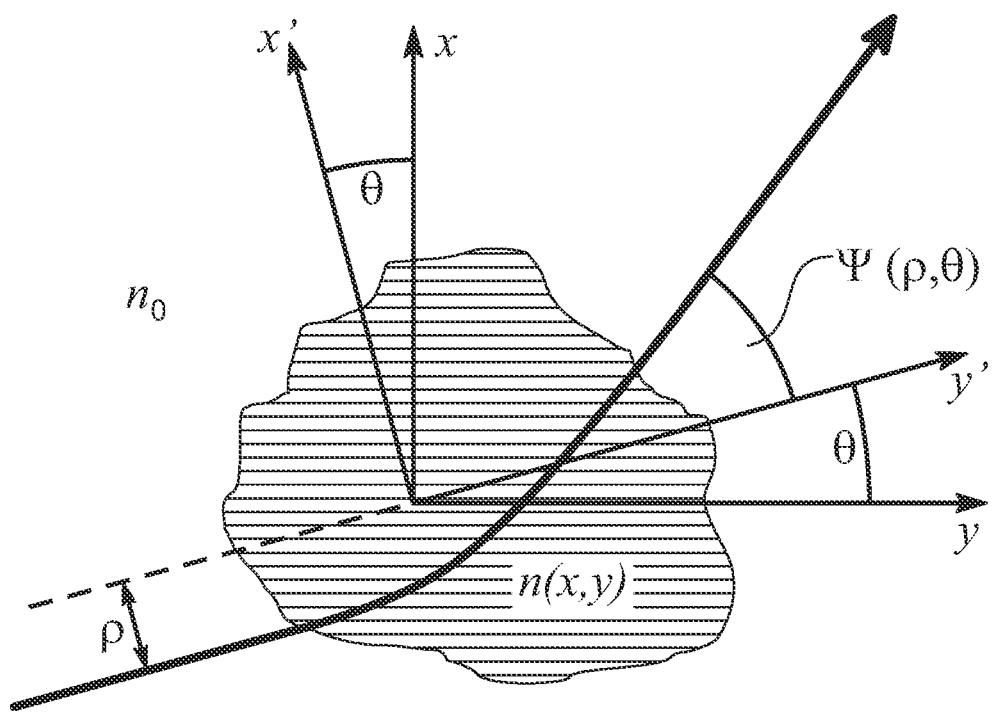
FIG. 3 illustrates the variables applicable to determining the refractive index profile using computed tomography.

As described above, CT is based on the well-known inverse Radon-transformation. This transformation can be written, when applied in the RIP field, as Equation (4)

$$n(r,\phi) - n_0 = \frac{1}{2\pi^2} \int_{-\pi/2}^{+\pi/2} \int_{-\infty}^{-\infty} \frac{\partial \eta(\rho,\theta)}{\partial \rho} \cdot \frac{1}{r\sin(\phi-\theta)-\rho} d\rho d\theta$$

where θ is the projection angle and ρ is the scanning position (as illustrated in FIG. 3 and discussed above) and η is the wavefront phase-shift caused by the object under investigation. (Note that in X-ray CT, η(ρ, θ) would be an absorption distribution, which leads to a reconstruction of a density distribution.) As always, the result of the Radon transformation is given in polar coordinates (r, ϕ), which are related to the Cartesian coordinates by x=r(cos ϕ) and y=r(sin ϕ). It is common to convert the resulting distribution numerically from n(r, ϕ) to n(x, y). Because the mesh grids of polar and Cartesian coordinates do not match, the reconstructed 2D RIP n(r, ϕ) can be converted to n(x, y) by using interpolations including, but not limited to, nearest neighbor, bilinear, cubic, and spline.

In contrast to interferometric RI profiling, the phase-shift diagram η(ρ, θ) is typically not directly measurable. Instead, the deflection function ψ(ρ, θ) is accessible and can be converted into the phase-shift diagram η(ρ, θ) by the approximation given in Equation (5)

$$\eta(\rho,\theta) = \int_0^\rho \Psi(\rho',\theta)d\rho' + \frac{n_0\rho}{12} \cdot [\Psi(\rho,\theta)]^3$$

where $n_0$ is the reference refractive index at ρ=0.

As usual for tomography, the measured data typically are pre-processed to improve the quality of the reconstruction. Such pre-processing is true in the RI profiling field, too, where the importance of an accurately defined deflection function origin is well-known. Regardless of how meticulously all mechanical parts and components of the measurement system 100 are manufactured and assembled, it is always beneficial to fine tune the origin numerically. For the evaluation of radii-symmetric profiles different approaches exist to achieve a so-called prepared deflection function, which is the measured deflection function with a fine-tuned origin $\psi_{prepared}(y) = \psi_{measured}(y-y_{shift}) - \psi_{Offset}$. The two parameters $\psi_{Offset}$ and $y_{shift}$ are very small, but typically not zero, for any particular measurement system 100. Several approaches to define those two parameters for radii-symmetric RIPs are mentioned in U.S. Pat. No. 10,508,973.

For non-symmetric RIPs, the deflection function for a fixed projection angle θ can be complex. Such complexity reduces the possibility of achieving a prepared deflection function $\psi_{prepared}(\rho, \theta) = \psi_{measured}(\rho - \rho_{shift}) - \psi_{offset}$. In tomography in general, however, many techniques exist to improve the quality of the reconstructed image. Although most of the research and algorithms to improve the reconstructed image quality focus on X-ray and NMR-CT, some of the methods are applicable in the field of tomographic RIP. For simplicity, just a few examples for improving the quality of the reconstructed image are given in the following disclosure; an artisan skilled in the field can pick and choose additional or alternative methods.

Defining $\rho_{shift}$ properly for each measured deflection angle distribution $\psi(\rho, \theta)$ can be understood as a well-known radii-run-out correction in tomography. A radii-run-out happens when instead of just a rotation along the Z-axis, which varies the projection angle θ, a trajectory movement occurs. Mathematically, this adds a shift for each projection angle θ. Radii-run-out affected tomographic reconstructed images typically suffer from smeared edges, indistinct features or transitions, and the like. As a result, a radii-run-out correction can be achieved by minimizing the entropy of the reconstructed image. In this case, $\rho_{shift}$ of each single projection needs to be varied and the reconstruction calculated. Because this iterative process requires the calculation of many time-consuming reconstructions, it is not very efficient. A preferred alternative approach is explained below.

Figure 17:
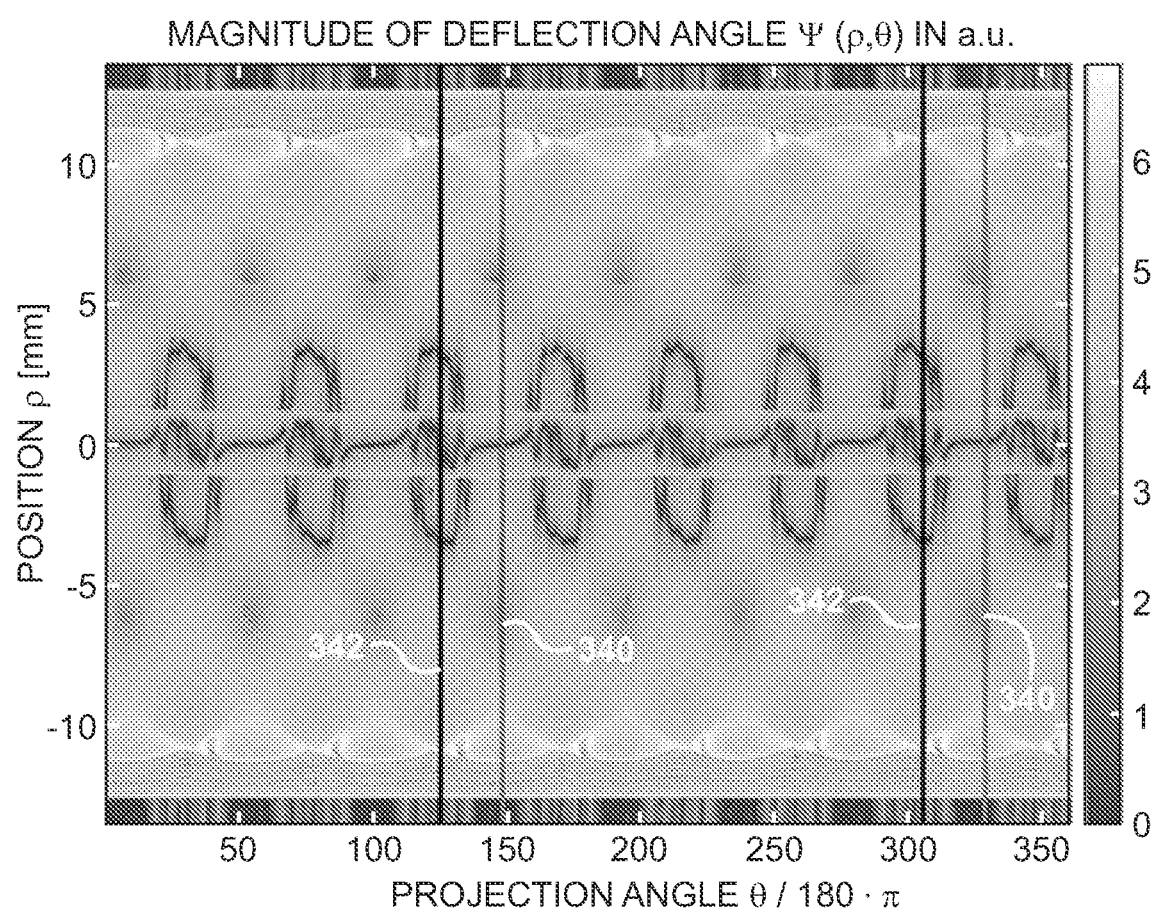
FIGS. 17-20 depict an example of applying an embodiment of the method of the present disclosure to a preform having a single core with an octagonal-shaped cladding and, specifically.

In most cases one or even more features within the measured sample can be used for a radii-run-out correction. An artisan skilled in the field can identify a suitable feature by the following criteria. The feature should have a sharp RI step (a RI difference of at least $10^{-3}$ over a few micrometers is preferred), so that any edge detection algorithm works well. It is also preferred that the feature defines or even surrounds the region of interest within the reconstructed 2D RIP. This criterion ensures that the edges of the feature are not distorted by the deflection of outer RI variations. In practice, the measurement of each projection angle θ will be shifted by an individual $\rho_{shift}$, so that the feature is aligned concentrically around the origin regardless of how chaotic the inside looks. As illustrated on the sinograms including in the drawing, this means that each column is vertically shifted so that a feature pair is aligned. FIG. 17 illustrates, for example, that a circular feature appears as the straight horizontal lines within the sinogram at $\rho \approx \pm 12$ mm. A non-circular feature appears as mirrored pairs of sinewaves in the sinogram, where the mirroring axis is $\rho = 0$ mm.

Besides a proper alignment of the measured deflection function $\psi_{measured}$ by $\rho_{shift}$, the quality of the reconstructed 2D RIP can also be improved by properly defining $\psi_{offset}$ for each measured projection. Because a measurement system 100 like the one illustrated in FIG. 4 uses a surrounding reference material, which has two beam perpendicular surfaces and a constant refractive index, the resulting phase-shift η through the reference on both opposite sides ($\rho = 0$ and $\rho = \rho_{ref}$) must be equal. This constraint can be used to fix $\psi_{offset}$ for each measured projection. In particular, the deflection function offset $\psi_{offset}$ is varied, so that the integration spanning the reference material on both sides (setting the upper integration limit ρ in Equation (5) to the reference position $\rho_{ref}$) leads to an equal phase-shift of $\eta(\rho=0) = \eta(\rho = \rho_{ref})$. Proper defining of $\rho_{shift}$ and $\psi_{offset}$ allows calculation of a prepared deflection function $\psi_{prepared}(\rho, \theta)$ and therefore a prepared phase-shift diagram $\eta_{prepared}(\rho, \theta)$.

Besides the RIP-specific mathematical tools to improve the quality of the reconstruction, more general CT tools also exist. The number of tools is not limited to the following given example about sinogram interpolation. The inverse Radon transformation has an integration over the scanning position ρ as well as over the projection angle θ. Ideally, both step sizes dρ and dθ are very small. A tradeoff exists, however, because a finer mesh size defined by dρ and dθ increases the required overall measurement time.

In addition to decreasing the mesh size by using smaller step sizes dρ, dθ, or both dρ and dθ, it is possible to interpolate within the sinogram. The interpolation of additional projection angles θ especially yields excellent results in terms of improving the reconstruction quality. The reason is that the sinogram typically does not change much on the small scale in the direction of dθ. In contrast, discontinuities typically exist in the direction of dρ. Starting from one or a few additional, interpolated projection angles θ between measured projections, the number of projections within the prepared sinogram can reach 10, 20, or even more times the number of measured projections. Many different methods can be applied for the two-dimensional interpolation including, without limitation, nearest neighbor, bilinear, cubic, and spline.

A frequency domain filter needs to be used to apply the inverse Radon transformation to the prepared phase-shift diagram $\eta(\rho, \theta)$. Different types of filters are suitable for image reconstruction. Among such filters are a Ram-Lak filter, a Shepp-Logan filter, a Cosine filter, a Hamming window filter, and a Hann window filter. A Ram-Lak filter is also known as a Ramp filter. This filter is sensitive to noise, so it is multiplied by a suitable window to improve the results. A Shepp-Logan filter is obtained by multiplying the Ram-Lak filter by the sinc or sampling function. The Cosine filter is obtained by multiplying the Ram-Lak filter by the cosine function. Similarly, the Hamming and Hann filters are obtained by multiplying the Ram-Lak filter by the Hamming and Hann windows, respectively. The Ram-Lak and Shepp-Logan filters are high-pass filters, which keep the edges information intact. The Cosine, Hamming, and Hann filters are band-pass filters. They are used to smooth the image and remove extra edges from the image.

In modern CT, plenty of methods exist to improve the quality of the reconstruction, which an artisan skilled in the field can apply here, too. Such improvement always depends, however, on the particular object under investigation: a particular method might be beneficial for a particular object or might just cause additional computational time or might even worsen the result. In the case of large deflections due to large refractive index steps within the object, it can be beneficial to apply back-propagation instead of straight-line back projection. This iterative procedure requires a lot of resources, however, resulting in longer computational time.

Measurement of the RIP of optical fiber preforms is important for inspection of the quality of optical fiber waveguides and also for specification of additional treatment (e.g., overcoating or etching) of the preform before drawing the fiber. For preforms, non-destructive techniques are particularly useful. The methods disclosed in this document are based on measurement of the deflection of a transversely directed light beam scanned through the preform. The methods are further based on numerical processing of a set of measured deflection functions at many angular projections. The methods disclosed above calculate the RIP still further based upon the assumption that the preform is circular. A method is desired, however, for tomography reconstruction of the RIP for preforms with a highly asymmetric cross section.

Attempts have been made to address the RI characterization of non-symmetrical fiber preforms. See, for example, K. Toga et al., "Microscopic Computer Tomography Measurement of Nonaxisymmetrically Distributed Optical Fiber Refractive Index," Journal of Lightwave Technology, Vol. 6, No. 1, pages 73-79 (1988); and B. Bachim et al., "Micro-interferometric Optical Phase Tomography for Measuring Small, Asymmetric Refractive-Index Differences in the Profiles of Optical Fibers and Fiber Devices," Applied Optics, Vol. 44, No. 3, pages 316-27 (2005). These two references are incorporated by reference in this document.

The following disclosure describes the steps of an improved method that provides an accurate RIP for an object that is either not symmetrical or at least not substantially symmetrical. Such preforms may be preforms with a non-intended asymmetry. In addition, the method can be used for multicore preforms, Panda-preforms (used to form a common style of polarization-maintaining fiber, having round and symmetrical stress rods on either side of the core to induce polarization), or preforms for fiber lasers with non-circular interfaces.

The improved methods for evaluating non-symmetrical glass fiber preforms have two main phases. The first phase involves a tomographic refractive index determination. The second phase involves correction of measurement artifact.

Figure 5A:
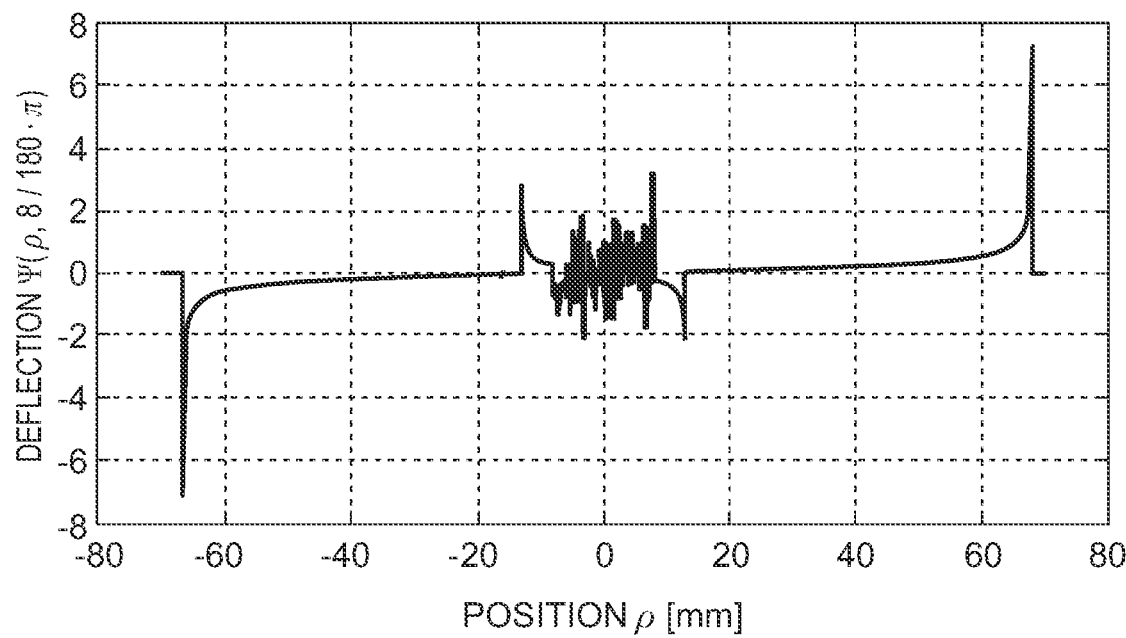
FIG. 5A is a graph of an example deflection angle distribution $\psi(\rho)$ (in degrees) plotted versus the position along the $\rho$-axis (in millimeters), after measurement of the deflection function for different orientations for a given projection angle (e.g., $\theta=8°$), during the first phase of an improved method for evaluating non-symmetrical glass fiber preforms.
Figure 5B:
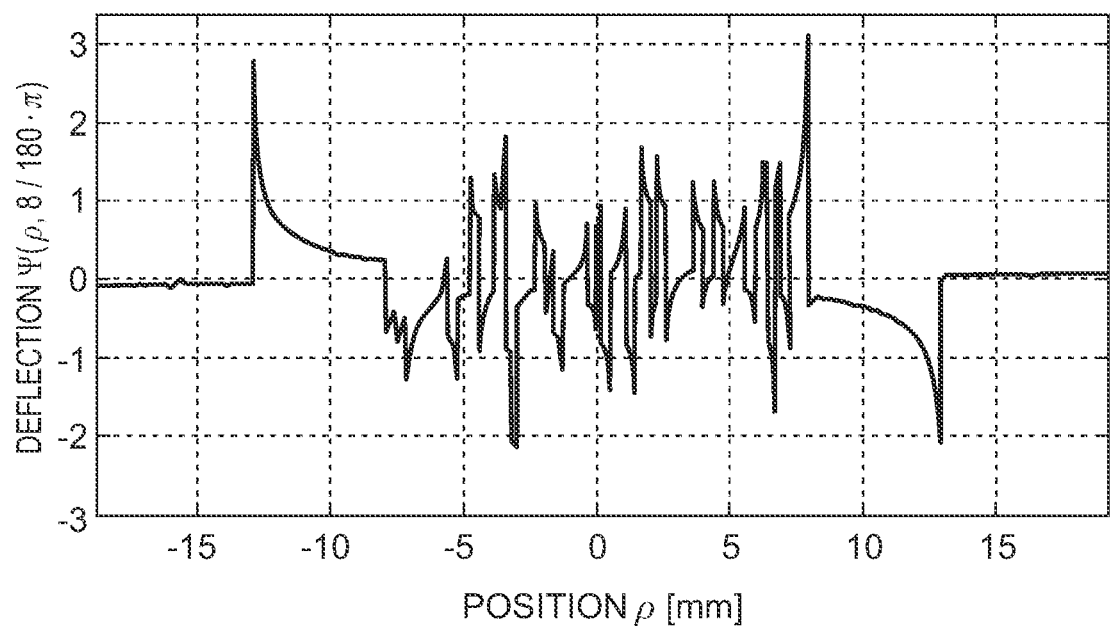
FIG. 5B is a graph that highlights the center portion of the graph of FIG. 5A using reduced scales along both the abscissa and ordinate.

In the first phase of the method, the deflection function is measured for different orientations (a single scan provides useless information for asymmetrical preforms). The number of measurements taken must balance the accuracy of the data (more measurements are desired to give higher resolution) against the time required to take measurements (fewer measurements are quicker). For example, the system 100 might take about 18 minutes to scan the preform every 2° using one light source, or about 3.6 hours to scan the preform every 0.5° using three light sources (scans in steps of 0.5° means that 720 measurements are made for the full 3600 around the preform). The measurements yield the deflection angle distribution $\psi(\rho, \theta)$. FIG. 5A is a graph of an example deflection angle distribution $\psi(\rho, \theta)$ (in degrees) for a simplistic case plotted versus the position along the $\rho$-axis (in millimeters) for a given projection angle ($\theta=8°$). FIG. 5B is a graph that highlights the center portion of the graph of FIG. 5A using reduced scales along both the abscissa and ordinate.

Once taken, the measurements are subject to tomographic evaluation. Such evaluation includes calculating the phase shift and stacking to form a sinogram. The sinogram provides a convenient way to represent the full set of data acquired during a scan and can be useful to check for systematical errors during data acquisition or to verify that the preprocessing steps (e.g., radii-run out correction) work correctly.

Figure 6:
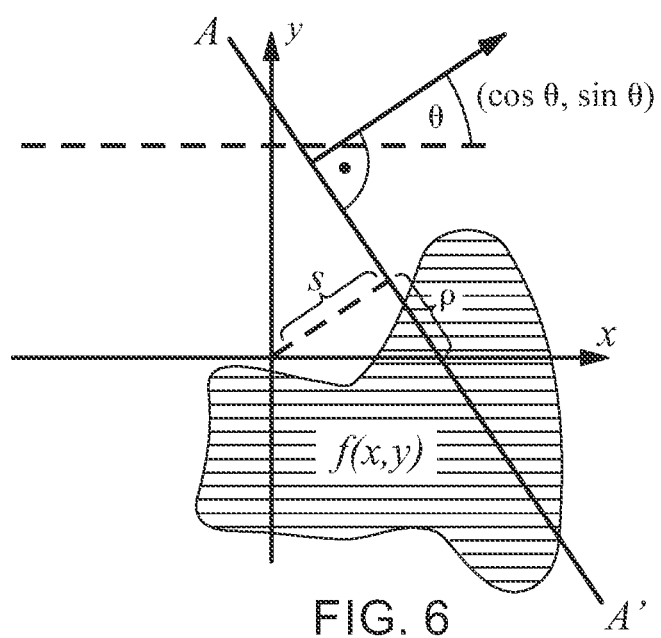
FIG. 6 illustrates the Radon transform which can be used to calculate data during the first phase of the improved method for evaluating non-symmetrical glass fiber preforms.

As illustrated in FIG. 6, the Radon transform is the integral transformation which takes a function $f$ defined on the x-y plane to a function $Rf$ (i.e., the Radon transform) defined on the two-dimensional ($\theta$, s) space of lines in the plane, whose value at a particular line is equal to the line integral of the function over that line. The parameter $\rho$ is the length of a portion of the straight line A-A', s is the distance of the line from the origin, and $\theta$ is the angle that the normal or perpendicular to the line makes with the x-axis. The transform was introduced in 1917 by Johann Radon, who also provided a formula for the inverse transform. Radon further included formulas for the transform in three dimensions, in which the integral is taken over planes (integrating over lines is known as the X-ray transform). It was later generalized to higher-dimensional Euclidean spaces, and more broadly in the context of integral geometry. The inverse Radon transformation is widely applicable to tomography, the creation of an image from the projection data associated with cross-sectional scans of an object.

If a function $f$ represents an unknown, then the inverse Radon transformation represents the projection data obtained as the output of a tomographic scan. Hence the inverse of the Radon transformation can be used to reconstruct the original quantity from the projection data, and thus it forms the mathematical underpinning for tomographic reconstruction, also known as iterative reconstruction. The depiction of the inverse Radon transformation data is often called a sinogram because the inverse Radon transformation of an off-center point source is a sinusoid. Consequently, the inverse Radon transformation of a number of scans appears graphically as a number of sine waves with different amplitudes and phases called a sinogram.

Figure 7:
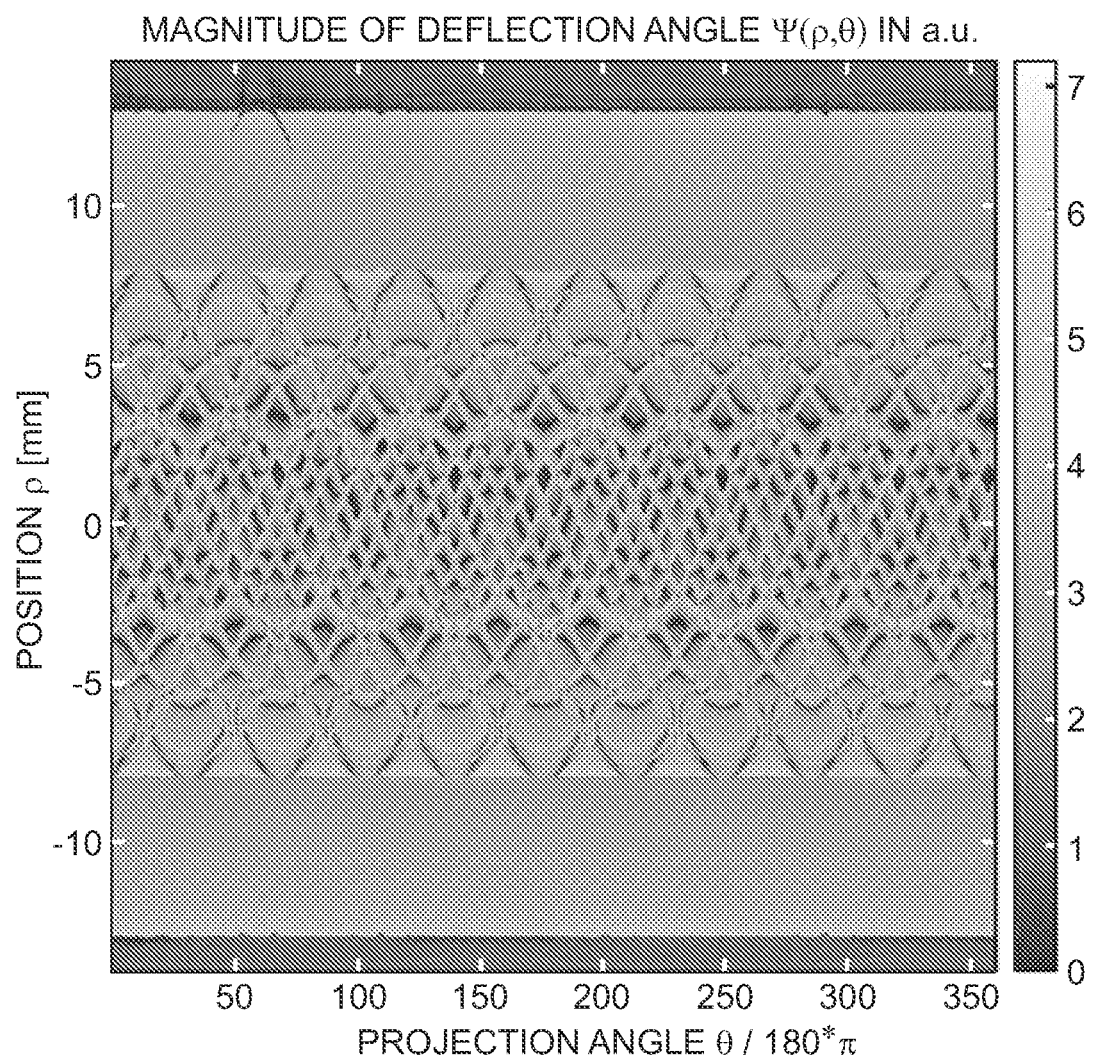
FIG. 7 is the sinogram that results from calculating the phase shift and stacking the measured data presented in FIG. 5.
Figure 8:
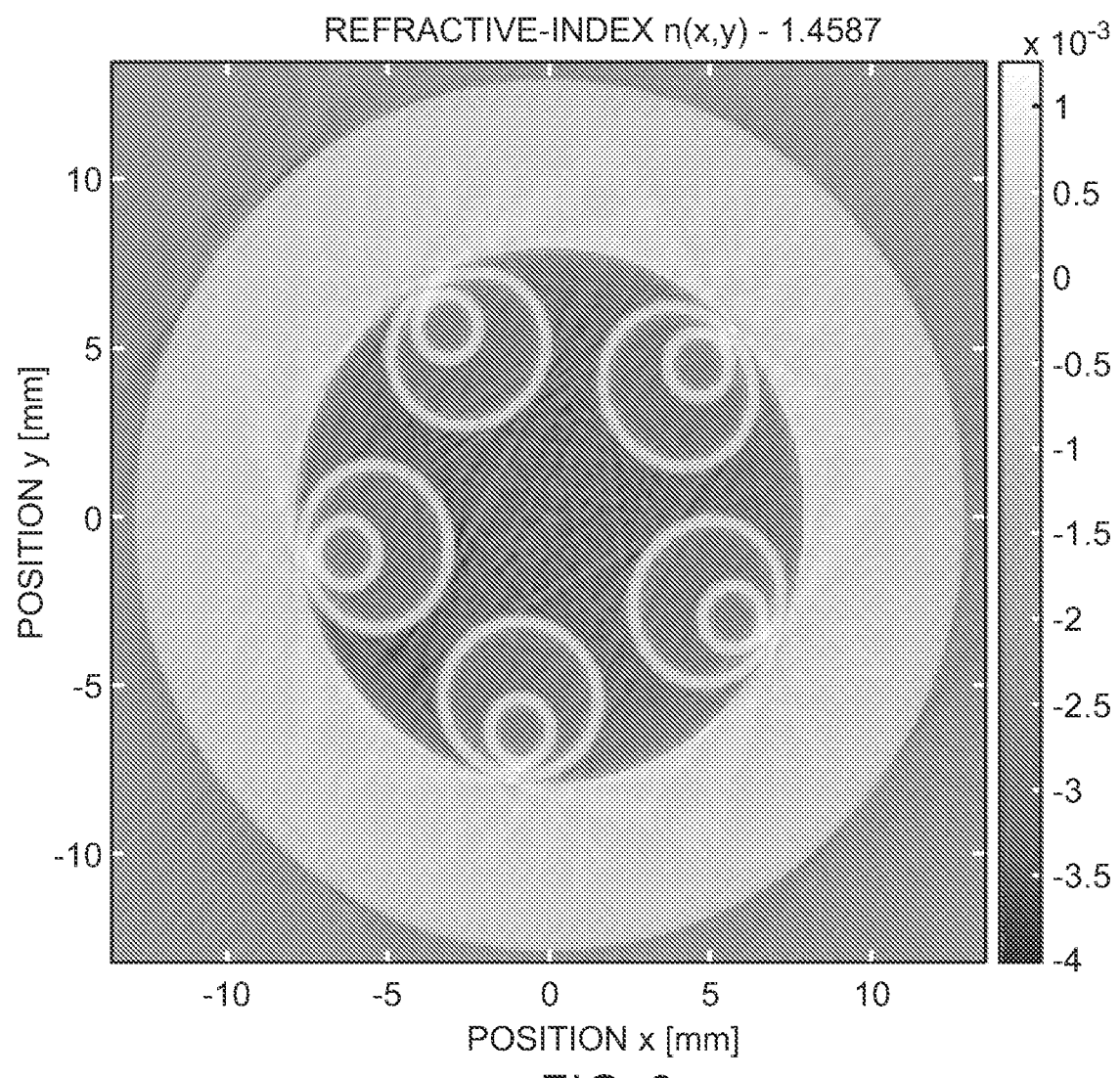
FIG. 8 shows a diagram of the relative refractive index in the x-y plane (i.e., for a line section of the preform) after applying the inverse of the Radon transform to the sinogram of FIG. 7.

FIG. 7 is the sinogram that results from calculating the phase shift and stacking the measured data presented in FIG. 5A. The phase shift is presented in arbitrary units (abbreviated a.u.). An arbitrary unit is a relative unit of measurement to show the ratio of an amount of a quantity to a predetermined reference measurement. By "predetermined" is meant determined beforehand, so that the predetermined characteristic must be determined, i.e., chosen or at least known, in advance of some event. FIG. 8 shows a diagram of the relative refractive index in the x-y plane (i.e., for a cross section of the preform) after applying the inverse of the Radon transform. The refractive index is indicated as a relative value based on the refractive index of the surrounding reference glass plate ($n_0=1.4587$).

Thus, the refractive index distribution is determined using known techniques (inverse Radon-transformation is preferred). These steps complete the first "tomographic" phase of the improved method for evaluating non-symmetrical glass fiber preforms. Unfortunately, the result will show the typical measurement artifact of underestimated refractive index steps, distorted profile, rounded edges, and the like.

The measurement artifact is corrected in the second phase of the method. Correction of the artifact is achieved by applying a method like the '973 method, described above, to a chosen line section of the 2D RIP obtained from the tomographic data (i.e., the "starting RIP"). A "modeled RIP" is created after assuming a symmetrical preform based on a few parameters (which will be varied). A "distorted RIP" is calculated from the modeled RIP by (i) simulating the deflection angle distribution for the modeled RIP, and (ii) calculating the distorted RIP from that simulated distribution. The parameters are varied for the modeled RIP until the distorted RIP is close to the starting RIP. This approach is an approximation. The calculation of the correction is done as if the starting RIP was measured at a preform with rotational symmetry, which is not the case. An important underlying assumption is that the measurement artifact for the actual sample is similar for rotationally symmetrical preforms.

The starting point for the improved evaluation method is the 2D-RIP based on the tomographic measurement and reconstruction (including all CT-techniques available today for improved imaging). One or more line sections of the regions of interest (cores, side pits, edges, and the like) are selected. According to each of the chosen line sections, an abstract, fictitious, but symmetrical preform is "fitted" to the chosen line section. For a simplified explanation it is assumed that the abstract, fictitious, symmetrical profile can be fitted directly. The profile cannot be fitted directly, however, because no analytical expression exists for such a RIP (which includes the typical measurement artifact).

Therefore, the fitting procedure includes the following steps for each iteration: (i) assuming a symmetrical preform based on a few parameters (which will be varied); (ii) simulating the deflection angle distribution; (iii) reconstructing the symmetrical RIP; and (iv) calculating the deviation of the chosen cross section. By this measuring and evaluation procedure the tomographic 2D RIP reconstruction handles all non-symmetries first (so that no systematical errors occur) and the fitting procedure of the line sections does the rest—especially addressing the typical measurement artifact in refractive index profiling.

Figure 9:
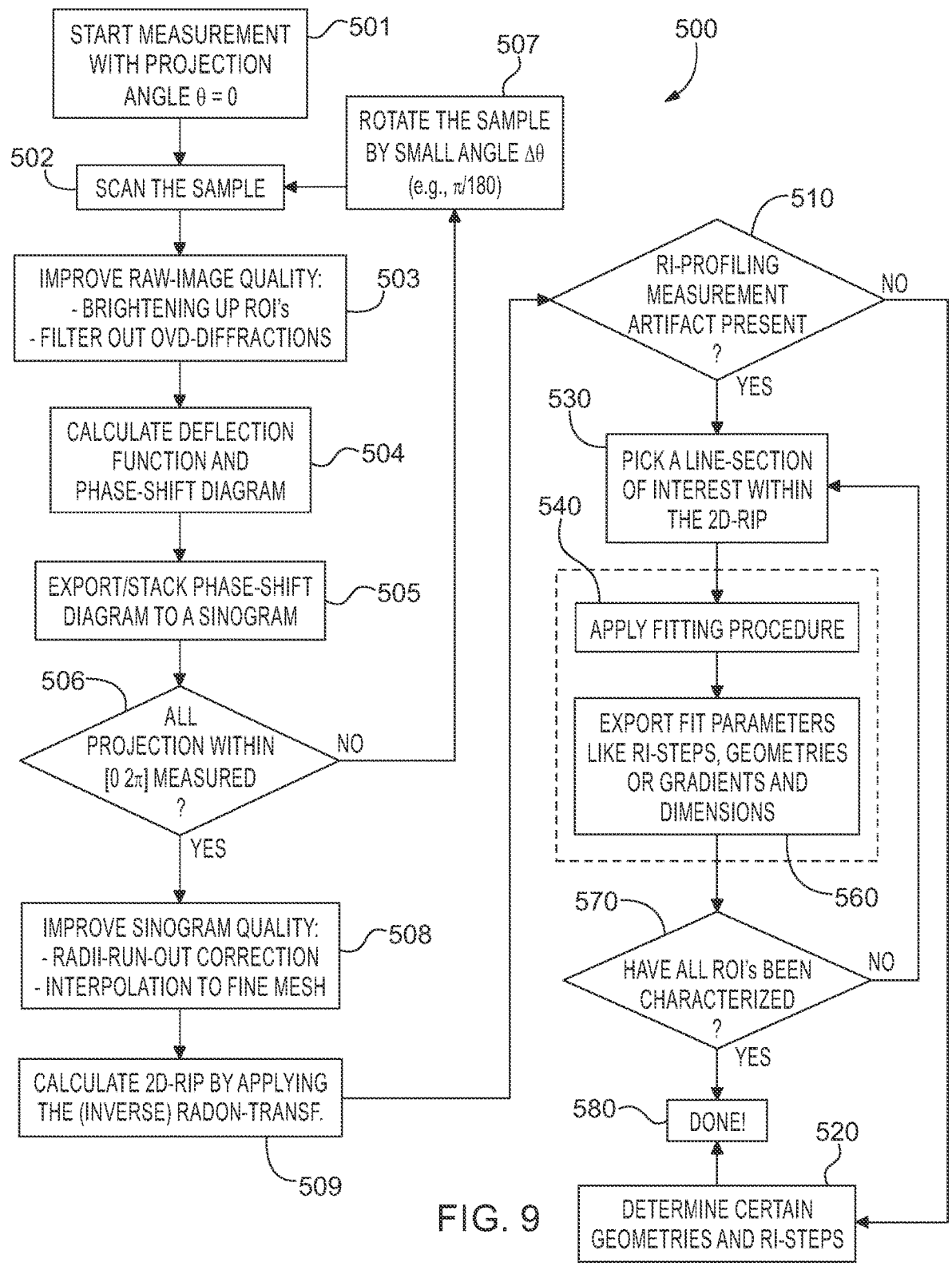
FIG. 9 is a flow diagram illustrating the steps of a specific embodiment of the improved method for evaluating non-symmetrical glass fiber preforms.

FIG. 9 is a flow diagram illustrating the steps of a specific embodiment of the improved method 500 that provides an accurate refractive index profile for an object that does not have a symmetrical cross section or at least a substantially symmetrical cross section. The method 500 determines a radial RIP of the cylindrical optical object 11 having a cylinder longitudinal axis around which at least one layer extends axially asymmetrically. In Step 501 of the method 500, the deflection function is measured beginning with a projection angle (theta) of zero. In Step 502, the object 11 is scanned. It is possible after completion of Step 502 to proceed directly to Step 504 of the method 500.

Optionally, although not required, a raw image can be created from the scan. In optional Step 503, the quality of the raw image can be improved using one or more of a variety of techniques. For example, the scanning camera has an "Image ROI" feature that allows the operator to specify the part of the sensor array to be used for image acquisition. ROI is an acronym for "region of interest." If an image ROI has been specified, the camera will only transmit pixel data from within that region. On most cameras, this specification significantly increases the maximum frame rate of the camera. The ROI can be brightened. Applying another technique, several images can be gathered with different exposures.

As another example of a technique that improves the quality of the raw image, a scanning camera with high dynamic range (or HDR) can be used. In a nutshell, HDR helps produce "better" pixels. The range of luminance levels has been increased via HDR so that enhanced differentiation among whites and blacks is possible. The range of colors has also been increased so that even colors can be more detailed.

As yet another example of a technique that improves the quality of the raw image, OVD-diffractions can be removed using a filtering algorithm. Outside vapor deposition (OVD) is a process by which glass is deposited in layers to create a porous deposition (glass soot). The porous glass deposition can be cleaned, for example, by flushing with chlorine gas (dehydrogenation) to reduce the OH-percentage. At the same time the porous deposition becomes a glass preform (vitrification). Regardless of the further processing steps like vitrification, the process-related micro layer structures may remain and may affect RI variation on a micro scale, too. These highly frequent RI variations lead to diffractions when scanned with a laser and even a non-coherent light beam.

Higher diffraction orders reduce the accuracy of the determination of the deflection angle up to really severe cases where the zero-order beam cannot be distinguished by higher orders. Because the high-frequency RI microlayer structures caused by the OVD manufacturing process typically are non-periodic and curved, the diffraction pattern can be quite irregular up to the point where higher diffraction orders can become brighter than those from the zero-order beam. It is well-known to an artisan that only the evaluation of the zero-order beam leads to a useful deflection angle distribution and a plausible RIP reconstruction. Depending on the level of severity of the OVD-diffraction (i.e., the intensity of light within higher diffraction orders), additional pre-processing by way of applying an OVD-filter algorithm may be required.

After Step 502, which includes scanning the object 11 with a light beam (starting with a first projection angle) and creating raw data representing the object through measured data, the method 500 can proceed along one of two alternative paths. The first alternative path involves rotating the object 11 by a small angle (theta) such as $\pi/180$ and repeating Step 502 iteratively until all projection angles within the full range (zero to $2\pi$) have been scanned and all measured data have been obtained. The method then processes and stacks the measured data to create a phase shift sinogram, and proceeds to Step 508.

The second alternative path after Step 502 is illustrated in FIG. 9. In Step 504 of the method 500, the deflection function and phase-shift diagram are calculated (as described above). It is also possible to calculate the phase shift diagram directly, without the intermediate step of calculating the deflection function (i.e., the intermediate step is optional). The phase-shift diagram is exported and stacked, also as described above, to form a sinogram in Step 505. The method 500 then asks, in Step 506, whether all projections within the full range (zero to $2\pi$) have been measured. If the full range has not yet been measured, then the method 500 implements Step 507. In Step 507, the object 11 is rotated by a small angle (theta) such as $\pi/180$ and the method 500 returns to Step 502 and scans the object 11. Steps 502, 503 (optional), 504, 505, 506, and 507 are repeated iteratively until all projections within the full range (zero to $2\pi$) have been measured and the method 500 can proceed to Step 508.

In optional Step 508, the quality of the sinogram can be improved using one or more of a variety of techniques. For one example, radii-run-out can be corrected. As another example, the sinogram can be interpolated to a fine mesh.

In Step 509, the 2D RIP is calculated from the sinogram by applying the inverse Radon transform. This calculation was described above. Step 509 completes the first phase of the method 500.

Step 510 begins the second phase of the method 500 and asks whether any significant RIP measurement artifacts are present in the 2D RIP. The measurement artifact occurs when a refractive index step transitions from a lower to a higher value (in the direction from outside to inside). This transition is relatively easy to determine for each selected line section. The word "significant" might specify, for example, the sharpness of the RI step (i.e., the sharper the step, the more significant is the artifact). If the step is a gradient and not sharp, such as for a germanium-doped core with a parabolic shaped RI), the artifact is either not present or can be neglected.

If the RIP measurement artifacts are not significant, then the method 500 implements Step 520. In Step 520, certain geometries and refractive index steps are determined before the method 500 concludes in Step 580. If significant RIP measurement artifacts are present in the 2D RIP, then the method 500 proceeds to Step 530. In Step 530, a line section of interest (also called a region of interest or ROI) is selected within the 2D RIP. A fitting procedure is then applied to the selected line section in Step 540. More details about the fitting procedures are provided in connection with FIG. 10 below.

Once the fitting procedure applied in Step 540 meets one or more stop criteria, then the method 500 proceeds to Step 560. A stop criterion might be determined by comparing the result of the fitting procedure against a predetermined accuracy level for the selected line section of the object 11 being evaluated. The predetermined accuracy level may depend upon the particular application. A typical predetermined accuracy is about 90%, a further predetermined accuracy is about 92%, a preferred predetermined accuracy is about 95%, a more preferred predetermined accuracy is about 97%, and a most preferred predetermined accuracy is about 99% or more.

In Step 560, fitting parameters such as RI-steps, geometries, gradients, and dimensions are exported. The method 500 then asks, in Step 570, whether all regions of interest within the preform have been characterized. If less than all of the regions of interest have been characterized, then the method 500 returns to Step 530 and a new line section of interest is selected within the 2D RIP. Steps 530, 540, and 560 are repeated iteratively until all regions of interest have been characterized and the method 500 can proceed to Step 580 and conclude.

Figure 10:
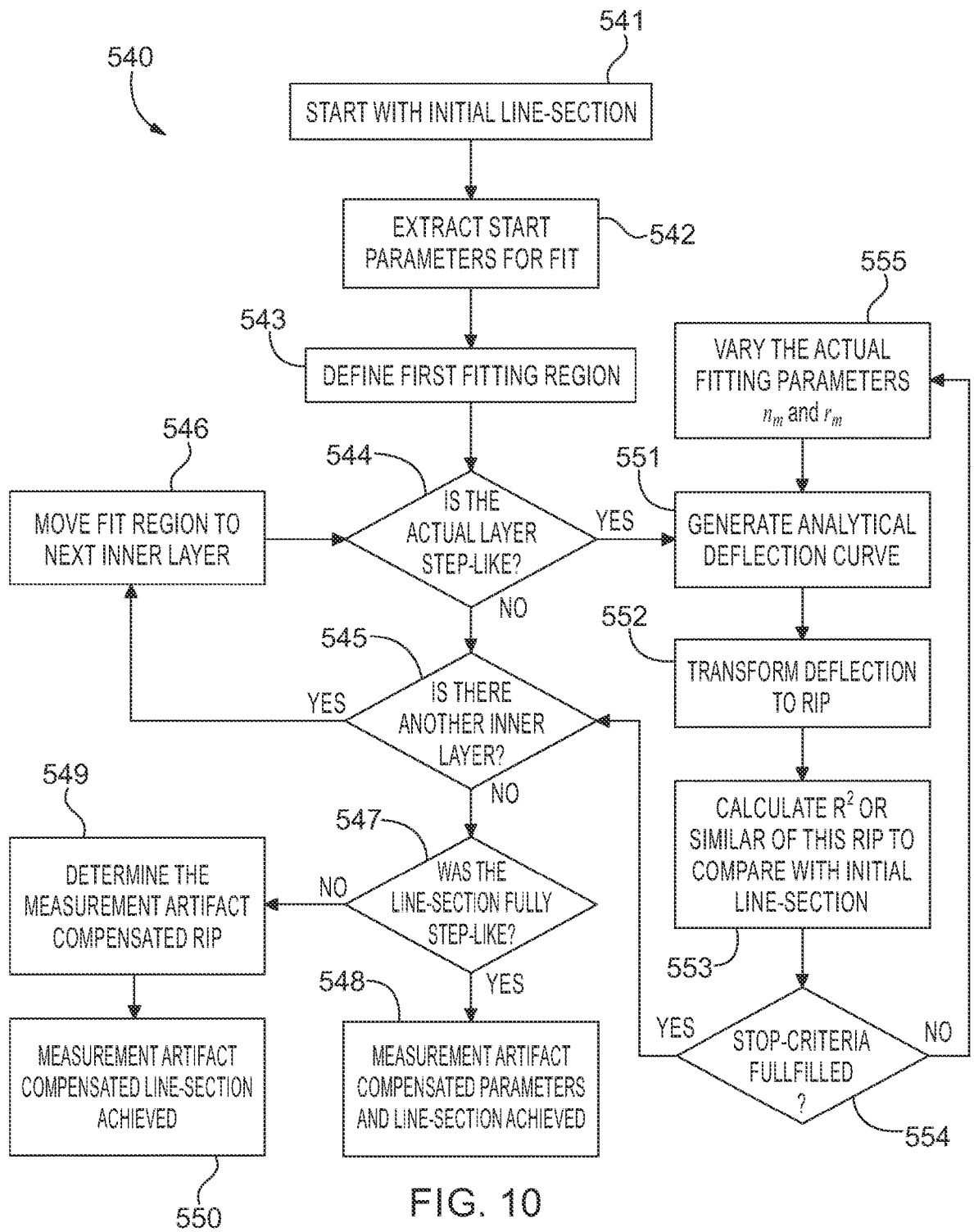
FIG. 10 is a flow diagram summarizing the steps of a specific embodiment of the fitting procedures which are applied in one step of the improved method illustrated in FIG. 9.

FIG. 10 is a flow diagram summarizing the steps of a specific embodiment of the fitting procedures applied in Step 540 of the improved method 500. The line section of interest (or ROI) that was selected within the 2D RIP in Step 530 is used as the start of the fitting procedure in Step 541. Start parameters for the fitting procedure are then extracted from the line section in Step 542 and the first fitting region is defined in Step 543. The method 500 then asks, in Step 544, whether the actual layer is step-like. If the answer to the question posed in Step 544 is negative, the method 500 asks in Step 545 whether another inner layer exists. If the answer to the question posed in Step 545 is positive, then the fit region is moved to the next inner layer in Step 546 and the method 500 returns to Step 544. Thus, a loop including Steps 544, 545, and 546 is created until the question posed in Step 544 is answered affirmatively or the question posed in Step 545 is answered negatively.

If the answer to the question posed in Step 545 is negative, then the method 500 asks, in Step 547, whether the line section is step-like. If the answer to the question posed in Step 547 is positive, then the measurement artifact compensated parameters and line section have been achieved, in Step 548, and the fitting procedure 540 ends. If the answer to the question posed in Step 547 is negative, then the measurement artifact compensated RIP is determined in Step 549 and the measurement artifact compensated line section is achieved in Step 550.

If the answer to the question posed in Step 544 is positive, then an analytical deflection curve of an axially symmetric RIP is generated that is intended to mimic the measurement artifact as an equivalent axially symmetric RIP in Step 551. The deflection is transformed to a deflection RIP in Step 552. Next, in Step 553, the accuracy of the deflection RIP is calculated in comparison to the initial line section. The accuracy may be measured by the R-squared statistic, which quantifies the predictive accuracy of a statistical model. The statistic shows the proportion of variance in the outcome variable that is explained by the predictions. It is also known as the coefficient of determination, $R^2$, $r^2$, and r-squares. $R^2$ typically has a value in the range of 0 through to 1 (or 100%). A value of 1 indicates that predictions are identical to the observed values; it is not possible to have a value of $R^2$ of more than 1. A value of 0 indicates that there is no linear relationship between the observed and predicted values, where "linear" in this context means that it is still possible that there is a non-linear relationship between the observed and predicted values. Finally, a value of 0.5 means that half of the variance in the outcome variable is explained by the model. Sometimes the $R^2$ is presented as a percentage (e.g., 50%).

The method 500 then asks, in Step 554, whether certain stop criteria have been fulfilled (e.g., a specific R-squared value was calculated in Step 553). With each iteration of the fitting procedure, the variation of the initial parameters ($n_k$ und $r_k$) becomes smaller and smaller. Once the variation becomes sufficiently small that it falls below a certain threshold, continuation of the fitting iterations is unnecessary. In practice, it does not make sense to do variations in $n_k$ smaller than, for example, $10^{-5}$, because there are other intrinsic errors that limit accuracy. The same observation applies to the layer radii, $r_k$.

If the answer to the question posed in Step 554 is negative, then the method 500 proceeds to Step 555 in which the actual fitting parameters $n_m$ and $r_m$ are varied before the method 500 returns to Step 551. Thus, a loop including Steps 551, 552, 553, 554, and 555 is created until the question posed in Step 554 is answered affirmatively. When the answer to the question posed in Step 554 is positive, then the method returns to Step 545.

Figure 11:
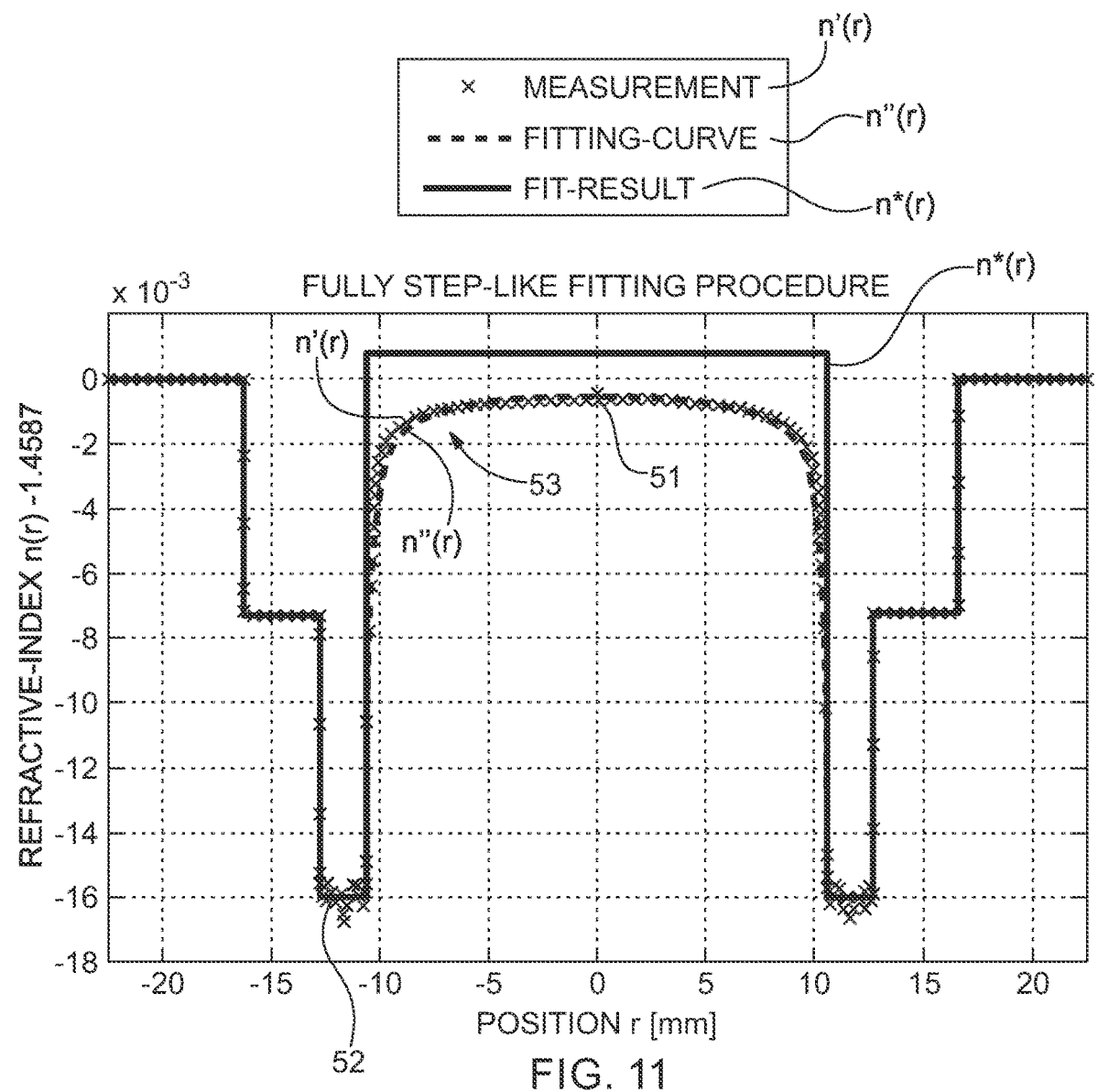
FIG. 11 shows a graph of the relative refractive index n(r)−1.4587 plotted versus the radius r (in millimeters) with a prepared refractive index profile n'(r) and a hypothetical refractive index profile n*(r) modeled by evaluation of the profile for a preform with a step profile.

The diagram of FIG. 11 shows, for a preform with a simple step profile, a prepared refractive index profile n'(r) and a hypothetical refractive index profile n*(r) modeled by evaluation thereof. The refractive index is indicated as a relative value based on the refractive index of the index adjustment fluid ($n_0$=1.4587). In the diagram, the relative refractive index n(r)−1.4587 is plotted versus the radius r (in millimeters).

The hypothetical refractive index profile n*(r) already depicts the refractive index profile of the preform to be expected in reality, or it is close to the refractive index profile. The hypothetical refractive index profile is based on the prepared refractive index profile n'(r) and the orientation values derived from the profile, which, in turn, include estimation values for the refractive index and the radii from the non-measurable region.

Using Equation (1), a simulated deflection angle distribution ψ"(y) is produced from the hypothetical refractive index profile n*(r) in the next method step. The simulated deflection angle distribution ψ*(y) obtained thereby is thus based on the assumption of a refractive index profile of the preform (namely the hypothetical refractive index profile n*(r)), which, in turn, after correction and evaluation of original measurement values, is derived from a prepared refractive index profile n'(r).

A simulated refractive index profile n"(r), plotted with this designation in FIG. 11, is obtained again by transforming the simulated deflection angle distribution ψ"(y) by numerical integration of equation (2). The profile has a rounded region 53 between a cladding region 52 and a core region 51. (As mentioned above, a core rod is often surrounded by an inner cladding layer of fluorine- or germanium-doped quartz glass and an outer cladding layer of undoped quartz glass in a preform.) Apart from this rounded region 53, the simulated refractive index n"(r) is almost congruent with the prepared refractive index profile n'(r). Considering that the assumed refractive index distribution n*(r) considerably differs therefrom, this is remarkable. The similarity is a hint that the assumptions underlying the hypothetical refractive index profile n*(r) are already very close to the real refractive index profile n(r) of the preform. That is, the hypothetical refractive index profile n*(r) in FIG. 11 reflects the real refractive index profile n(r) accurately or at least adequately accurately.

In practice, an exact match between the simulated refractive index profile n"(r) and the prepared refractive index profile n'(r) cannot be achieved. It is possible to achieve an adequately and arbitrarily accurate adaptation, however, by iteratively fitting the simulated refractive index profile n"(r) to the prepared refractive index profile n'(r). An alternative and generalized fitting procedure can be explained with reference to FIG. 12.

Figure 12:
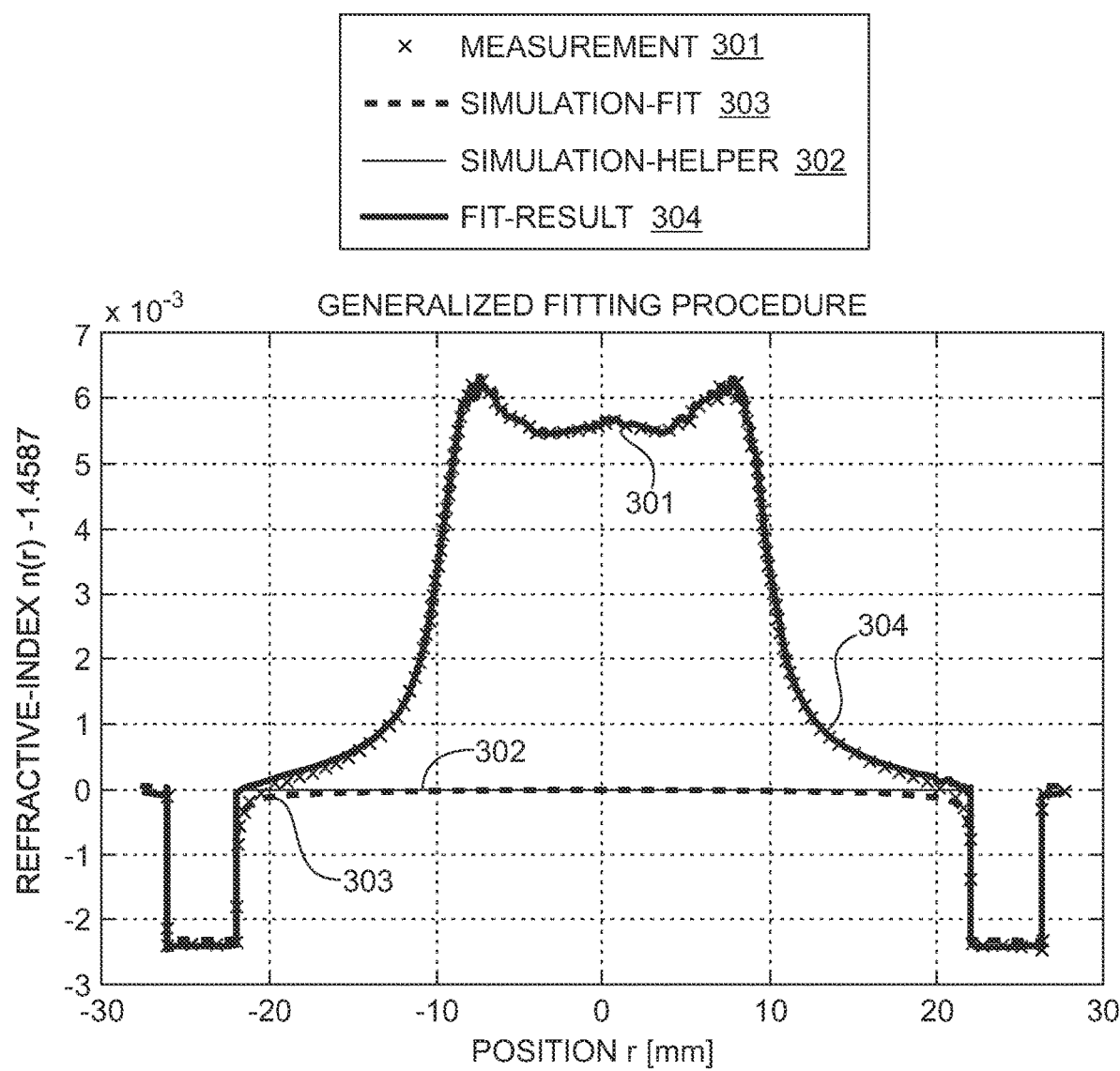
FIG. 12 is a graph of the relative refractive index n(r)−1.4587 plotted versus the radius r (in millimeters) illustrating the generalized fitting procedure.

The alternative fitting procedure allows a more accurate evaluation of a RIP that is not fully step-like but has a present measurement artifact due to a sharp RI step from low to high (in the direction from outside to inside). In FIG. 12, certain relative refractive indexes n(r)−1.4587 are plotted versus the radius r (in millimeters). The measured data 301 are depicted with an "X." The RIP typical measurement artifact appears at r=±22 mm, so that the reconstructed measurement differs from the real RIP inside that region. The goal of the fitting procedure is to determine the RI-step and its related artifact error, which can be used to correct the measured data 301 afterward. For that purpose and similar to the previously explained fitting procedure, a simulation helper 302 and the related simulation fit or fitting curve 303 are given. The simulation helper 302 is an assumed RIP, generated with the goal of estimating and covering the RI step at r=±22 mm. The assumed RIP of the simulation helper 302 allows generation of a deflection function by using equation (1). Transforming this deflection function by using equation (2) leads to the fitting curve 303.

For a fixed range (e.g., 21 mm<|r|), the parameters of the simulation helper 302 are varied, so that the fitting curve 303 matches the measured data 301 around the RI step. The region must be small enough so that any inner RI gradients do not affect the fit, but also broad enough that this rounded curve shape can be fitted robustly enough. Depending on the visual feedback, a skilled artisan may tune the chosen region to improve the fitting procedure.

Adding the difference between the simulation helper 302 and the fitting curve 303 to the measured data 301 leads to the fit result 304. The result is more accurate than the measured RIP. For more complex preforms, this fitting procedure can be repeated as needed on every occurring RI step. In this case, the RIP of the simulation helper 302, the fitting curve 303, and fit result 304 are stitched together accordingly for each of the different regions.

Even in the particular case where the characterized preform itself does not have such a described RI step but with an RI of undoped fused silica near the outer surface, this method is also extremely useful for the following reason. Setups like apparatus 100 usually have an undoped fused silica measuring cell 9 because this material is homogeneously available and the absolute RI is well-known including its dispersion, temperature-dependency, and other characteristics. It is also state of the art to use the index adjustment fluid 10 to keep the occurring deflection angles small enough so that the apparatus 100 can capture them. If the RI of the index adjustment fluid 10 were above the measuring cell 9 and the RI at the outer region of the glass object 11, the measurement artifact would appear at the boundary of the measuring cell 9 and the index adjustment fluid 10 and would affect the whole inner region, too. The only way to avoid this artifact completely would be if the index adjustment fluid 10 perfectly matched the measuring cell 9 and the outer region of the glass object 11. Besides the practicality issue in general (due to the strong temperature dependency of liquids suitable as the index adjustment fluid 10), this would completely eliminate the boundaries, so that no differentiation between the glass object 9, the index adjustment fluid 10, and the measuring cell 11 would be possible.

Examples

The following examples are included to more clearly demonstrate the overall nature of the disclosure. These examples are exemplary, not restrictive, of the disclosure.

Figure 13:
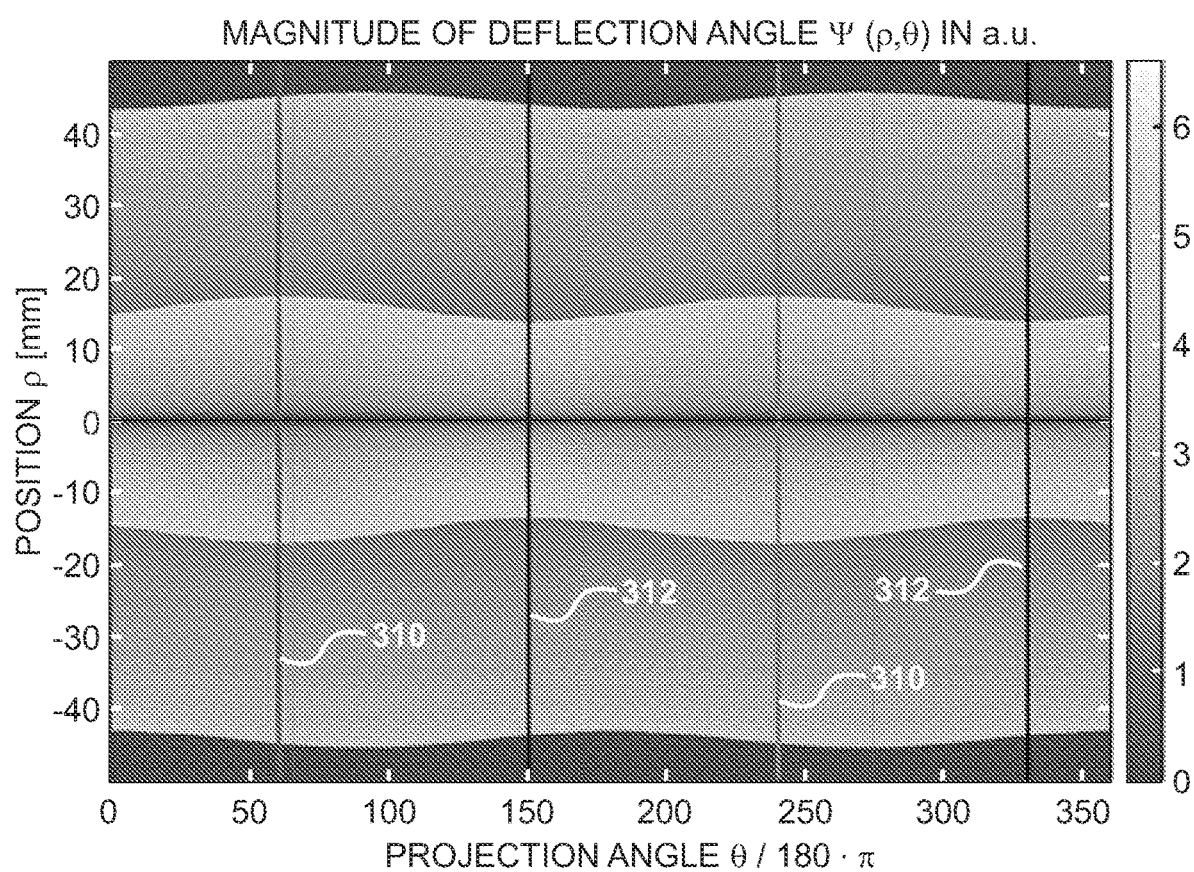
FIGS. 13-16 depict an example of applying an embodiment of the method of the present disclosure to a preform having a single elliptical core and, specifically.

FIGS. 13-16 depict Example 1 for a preform having a single elliptical core. FIG. 13 is the sinogram created by applying the method 500, i.e., rotating the preform, taking measurements, and stacking the measurements left-to-right. Depicted is a single sinusoidal wave shape, reflecting the single core, before application of the Radon transformation. Note the vertical lines reflecting a first line section 310 and a second line section 312. The sinogram shows the magnitude of the deflection angle distribution $\psi(\rho, \theta)$ in arbitrary units in the $\rho$-$\theta$ plane.

Figure 14:
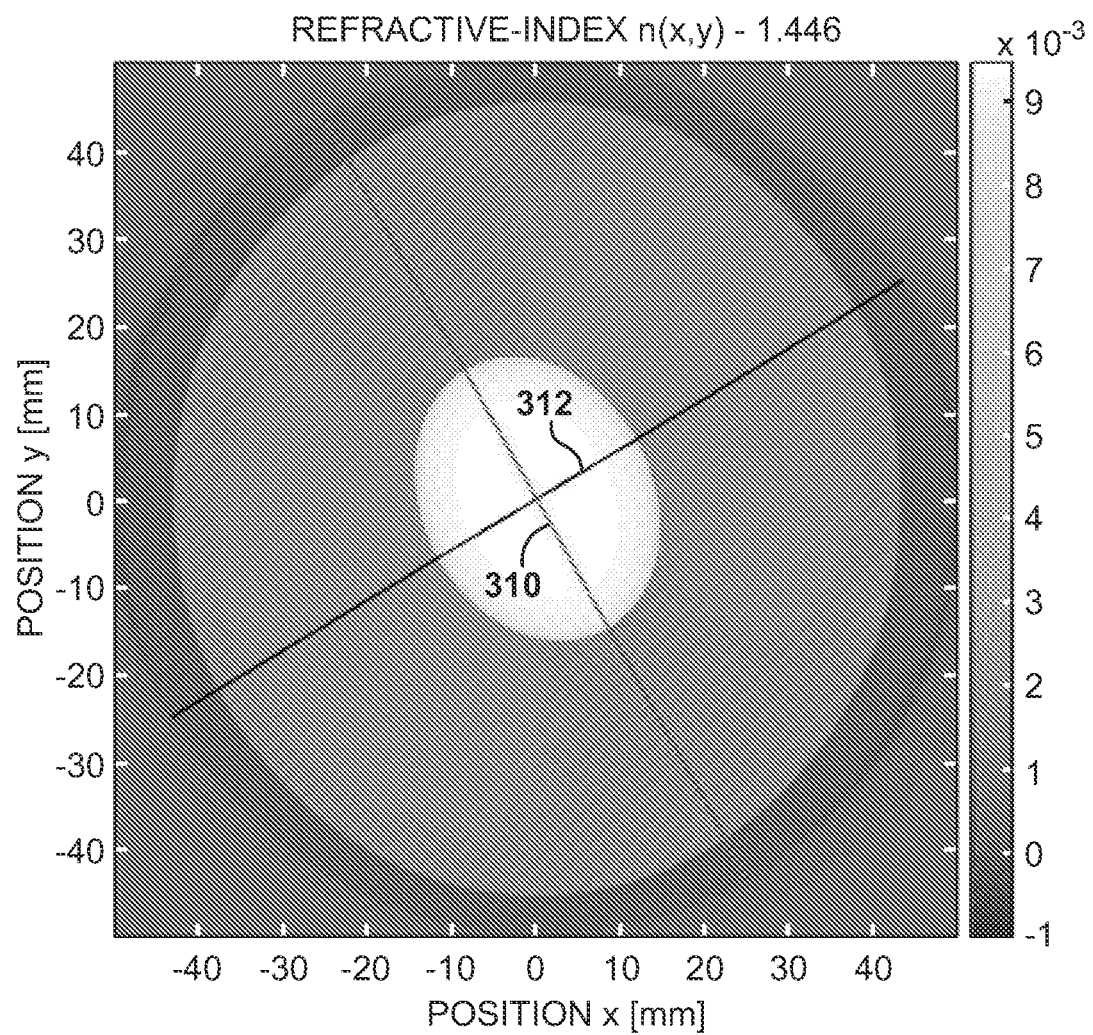

FIG. 14 is a diagram of the relative refractive index n(x, y)−1.446 in the x-y plane, illustrating the reconstructed 2D RIP of the preform having a single elliptical core. The first line section 310 is taken along the major axis (the longest diameter) of the ellipse between the two vertices of the ellipse. The second line section 312 is taken along the minor axis or shortest diameter of the ellipse.

Figure 15:
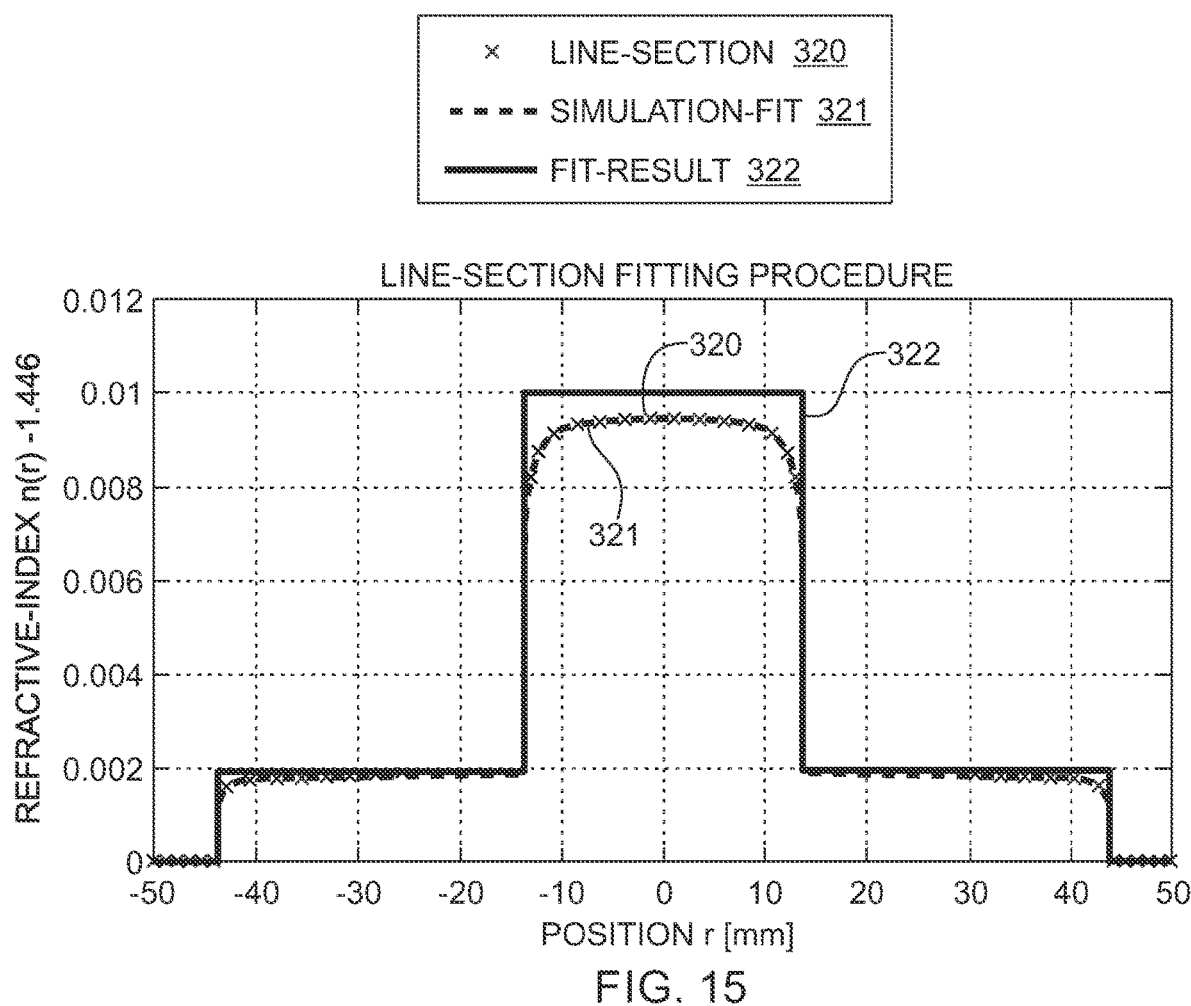

Data taken along the second line section 312 drawn through the core of the diagram of FIG. 14 are presented in the graph of FIG. 15, illustrating the line section fitting procedure. The graph plots the relative refractive index n(r)−1.446 against the position r in millimeters. FIG. 15 illustrates a main concept of the method 500. The graph of FIG. 15 includes three curves: a curve 320 through the picked, tomographic reconstructed line section data, the simulation fit curve 321, and the fit result (or assumed) curve 322. The assumed RI steps were 0.002 and 0.01, which can be extremely well evaluated with the method 500.

Figure 16:
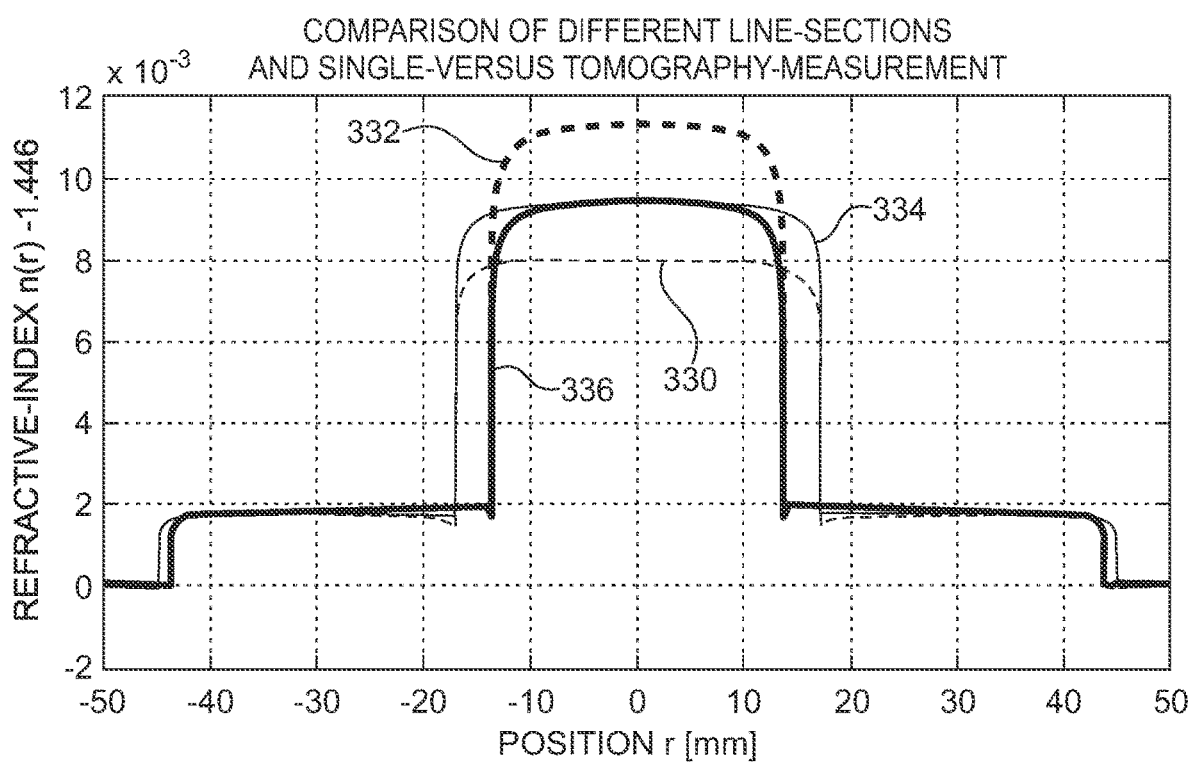

FIG. 16 highlights the need for a tomographic measurement and the evaluation method therein, using the first line section 310 and the second line section 312. The graph of FIG. 16 plots the relative refractive index n(r)−1.446 against the position r in millimeters, for the preform having a single elliptical core, and compares the two different tomographic line sections versus the single related measurements. Curve 330 depicts the single measurement along the first line section 310; curve 332 depicts the single measurement along the second line section 312. Curve 334 depicts the tomography measurement along the first line section 310; curve 336 depicts the tomography measurement along the second line section 312. Thus, the method 500 can be compared to a straight-forward evaluation (a basic inverse Abel transformation). Depending on the orientation during the single measurements, the result can vary greatly. In contrast, the level of the RIP is independent of the chosen line sections. The fit functions and the resulting profiles of the method 500 are omitted to avoid overloading the graph.

FIGS. 17-20 depict Example 2 for a preform having a single core with an octagonal-shaped cladding which might be considered almost radii-symmetric. The core is made of fluorine-doped quartz glass sold under the registered trademark Fluosil® by Heraeus Quarzglas GmbH & Co. KG of Germany. FIG. 17 is the sinogram created by applying method 500, i.e., rotating the preform, taking measurements, and stacking the measurements left-to-right. Note the vertical lines reflecting a first line section 340 and a second line section 342. The sinogram shows the magnitude of the deflection angle distribution ψ(ρ, θ) in arbitrary units in the ρ-θ plane.

Figure 18:
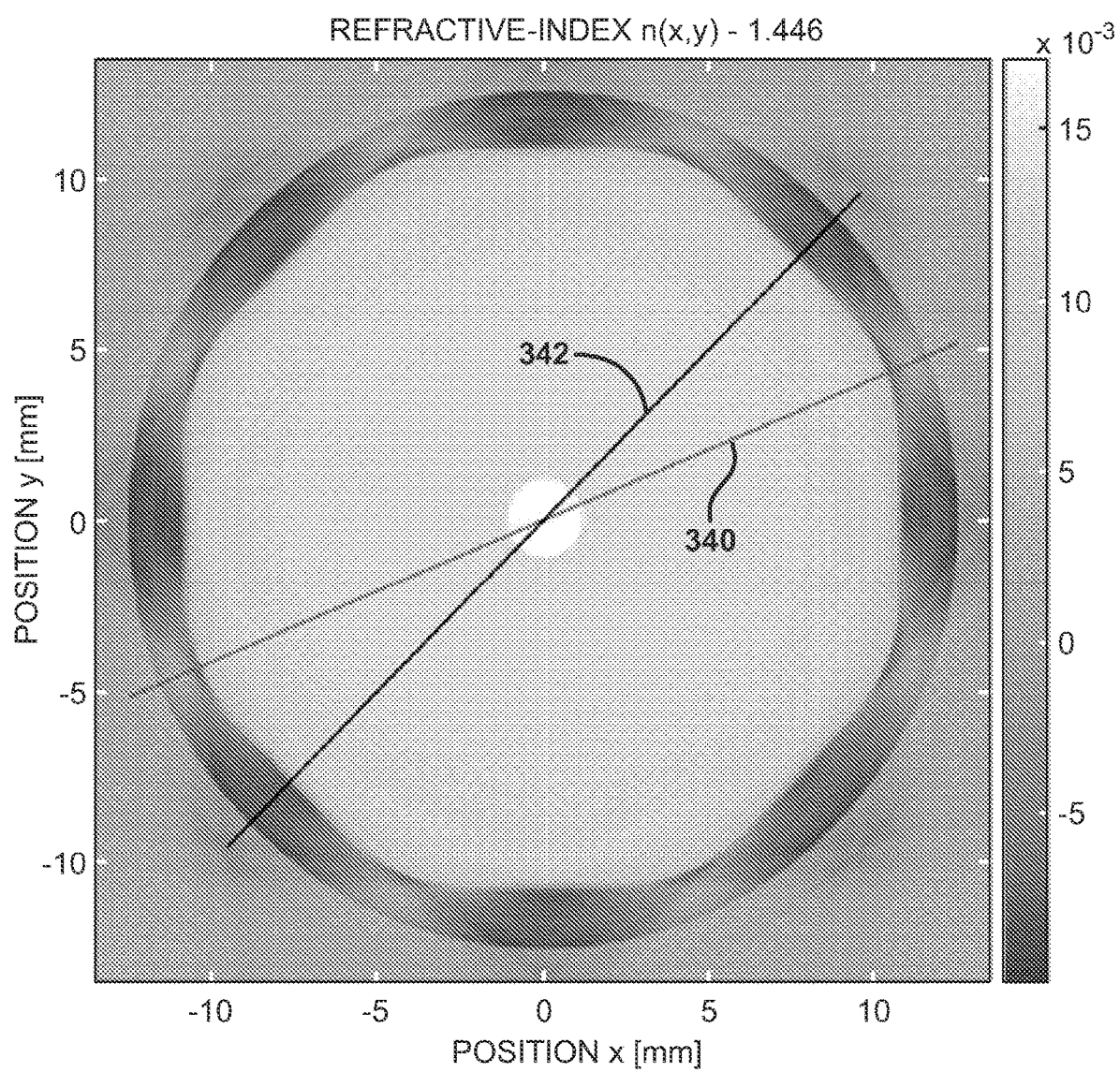

FIG. 18 is a diagram of the relative refractive index n(x, y)−1.446 in the x-y plane, illustrating the reconstructed 2D RIP of the preform having an octagonal-shaped cladding. The first line section 340 is taken along the longer axis through opposing apexes of the octagonal-shaped cladding. The second line section 342 is taken along the shorter axis through opposing flat sections between apexes of the octagonal-shaped cladding.

Figure 19:
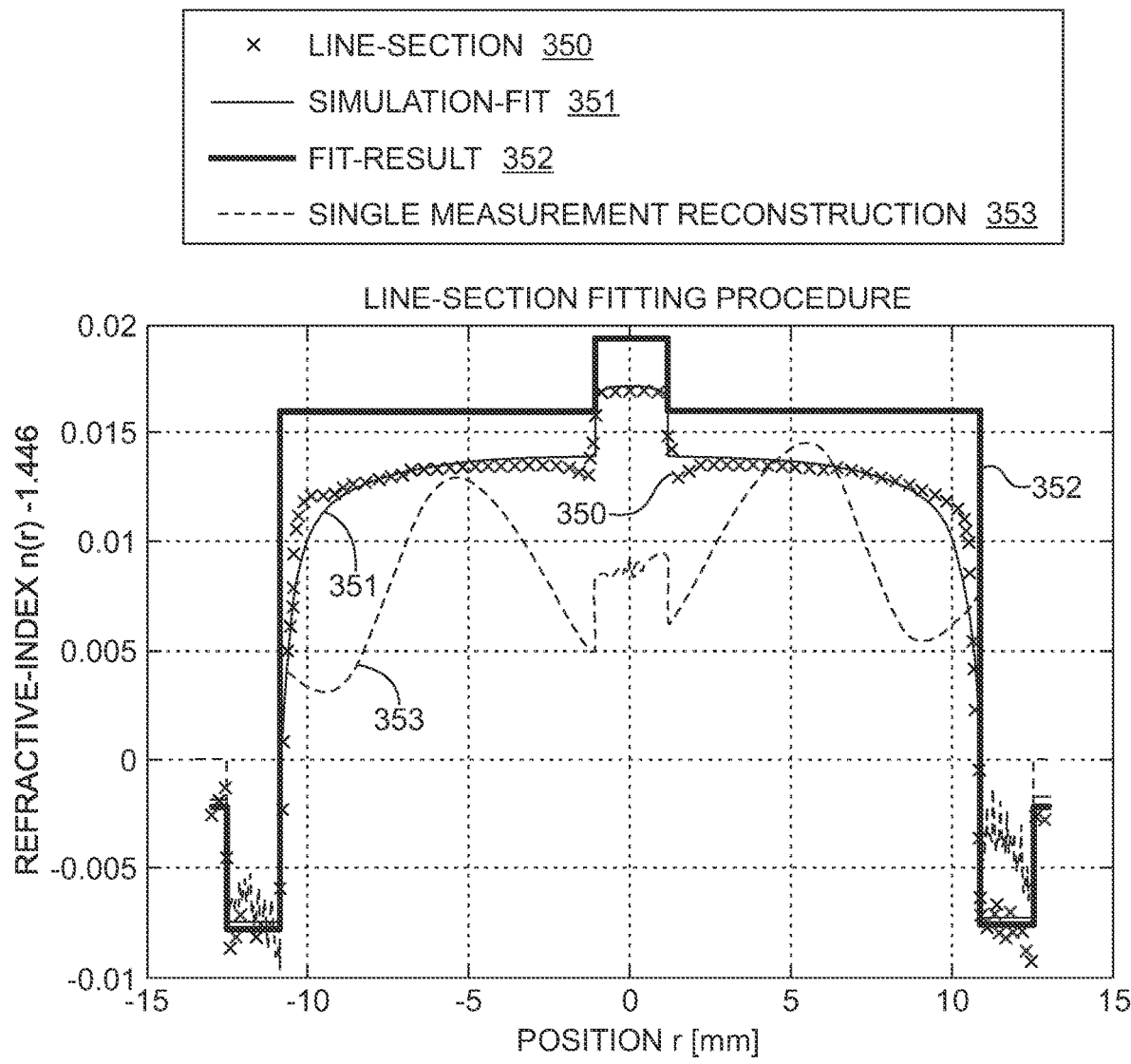

Data taken along the line section 342 drawn through the core of the diagram of FIG. 18 are presented in the graph of FIG. 19, illustrating the line section fitting procedure. The graph plots the relative refractive index n(r)−1.446 against the position r in millimeters. The graph of FIG. 19 includes four curves: a curve 350 through the measured line section data, the simulation fit curve 351, the fit result (or assumed) curve 352, and the single measurement reconstruction curve 353. The graph shows the merits of the method 500 and highlights the need for the tomographic evaluation upon comparison to the single measurement.

Figure 20:
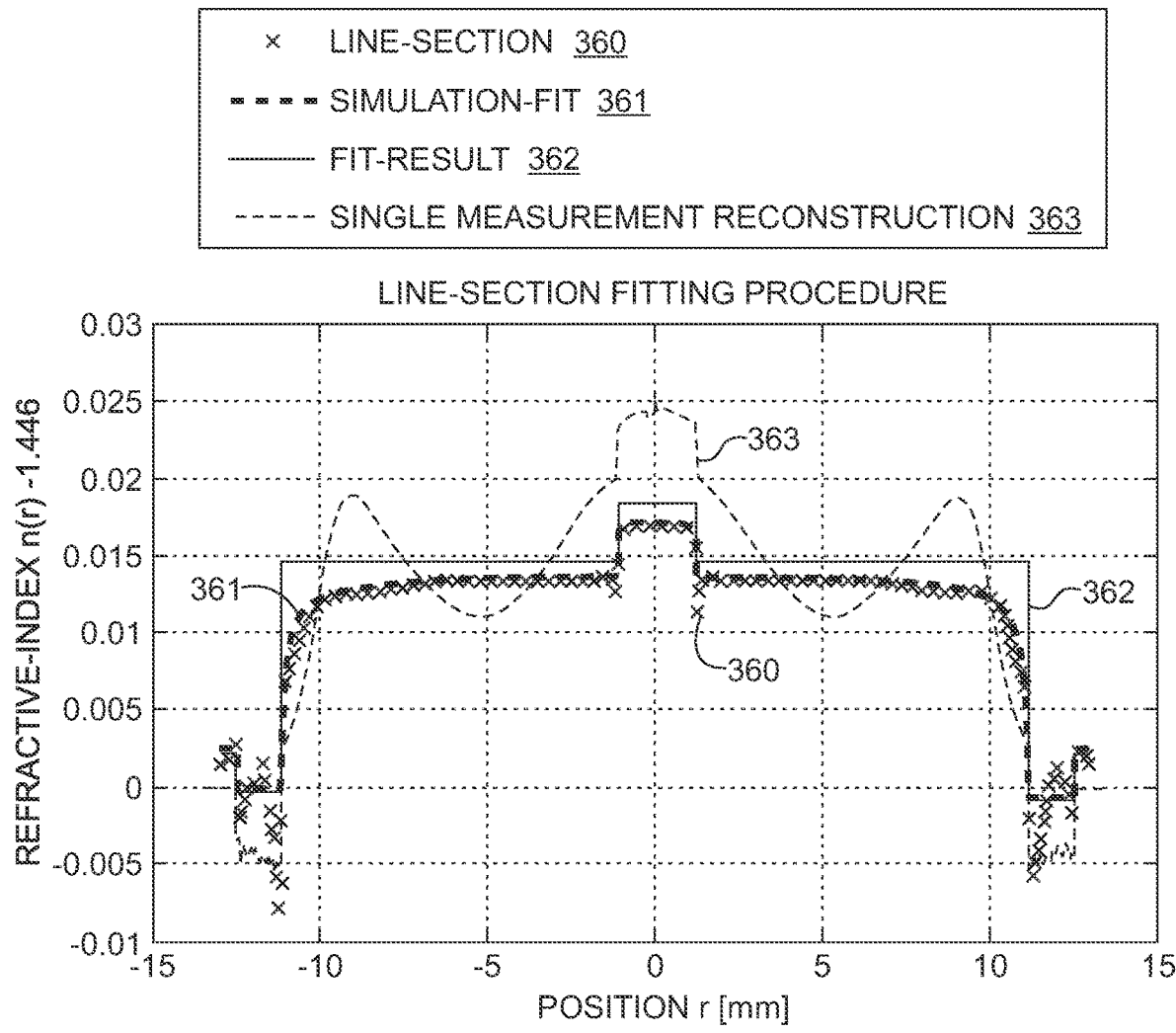

Data taken along the line section 340 drawn through the core of the diagram of FIG. 18 are presented in the graph of FIG. 20, illustrating the line section fitting procedure. The graph plots the relative refractive index n(r)−1.446 against the position r in millimeters. The graph of FIG. 20 includes four curves: a curve 360 through the measured line section data, the simulation fit curve 361, the fit result (or assumed) curve 362, and the single measurement reconstruction curve 363. The graph shows the merits of the method 500 and highlights the need for the tomographic evaluation upon comparison to the single measurement.

Figure 21:
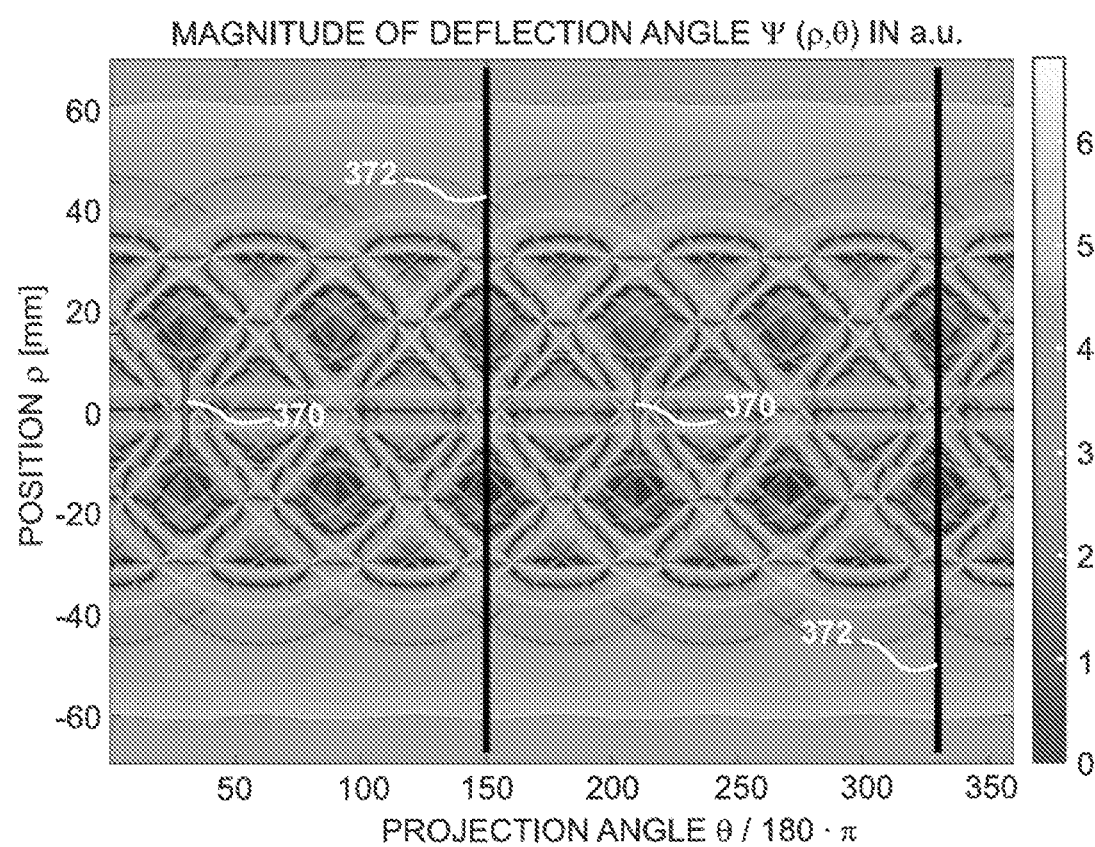
FIGS. 21-24 depict an example of applying an embodiment of the method of the present disclosure to a preform having seven cores and, specifically.

FIGS. 21-24 depict Example 3 for an even more complex preform having seven cores. FIG. 21 is the sinogram created by applying the method 500, i.e., rotating the preform, taking measurements, and stacking the measurements left-to-right. Depicted are six sinusoidal wave shapes, one for each of the non-central cores. Note the vertical lines reflecting a first line section 370 and a second line section 372. The sinogram shows the magnitude of the deflection angle distribution ψ(ρ, θ) in arbitrary units in the ρ-θ plane.

Figure 22:
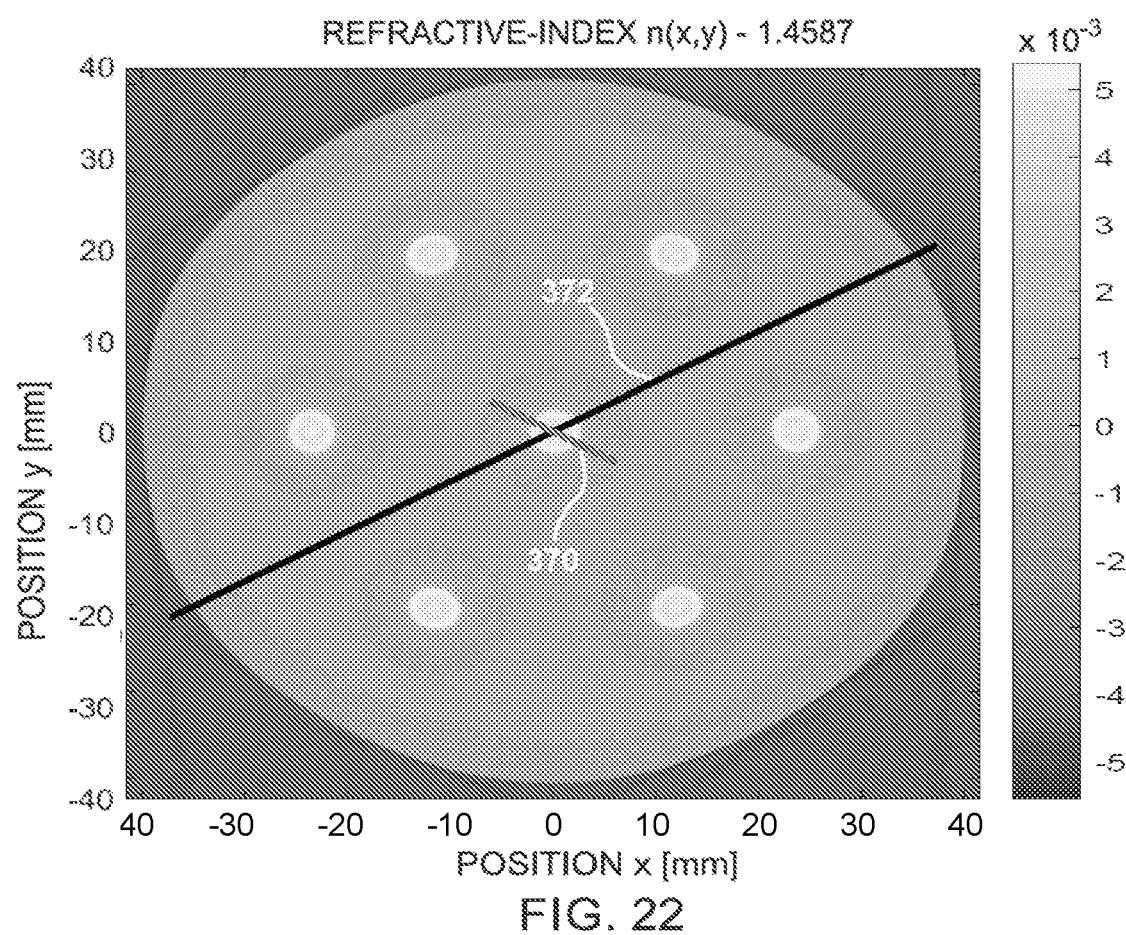

FIG. 22 is a diagram of the relative refractive index n(x, y)−1.4587 in the x-y plane, illustrating the reconstructed 2D RIP of the preform having seven cores. The first line section 370 is a shorter line section taken through the center core. The second line section 372 is a longer line section taken through the center core.

Figure 23:
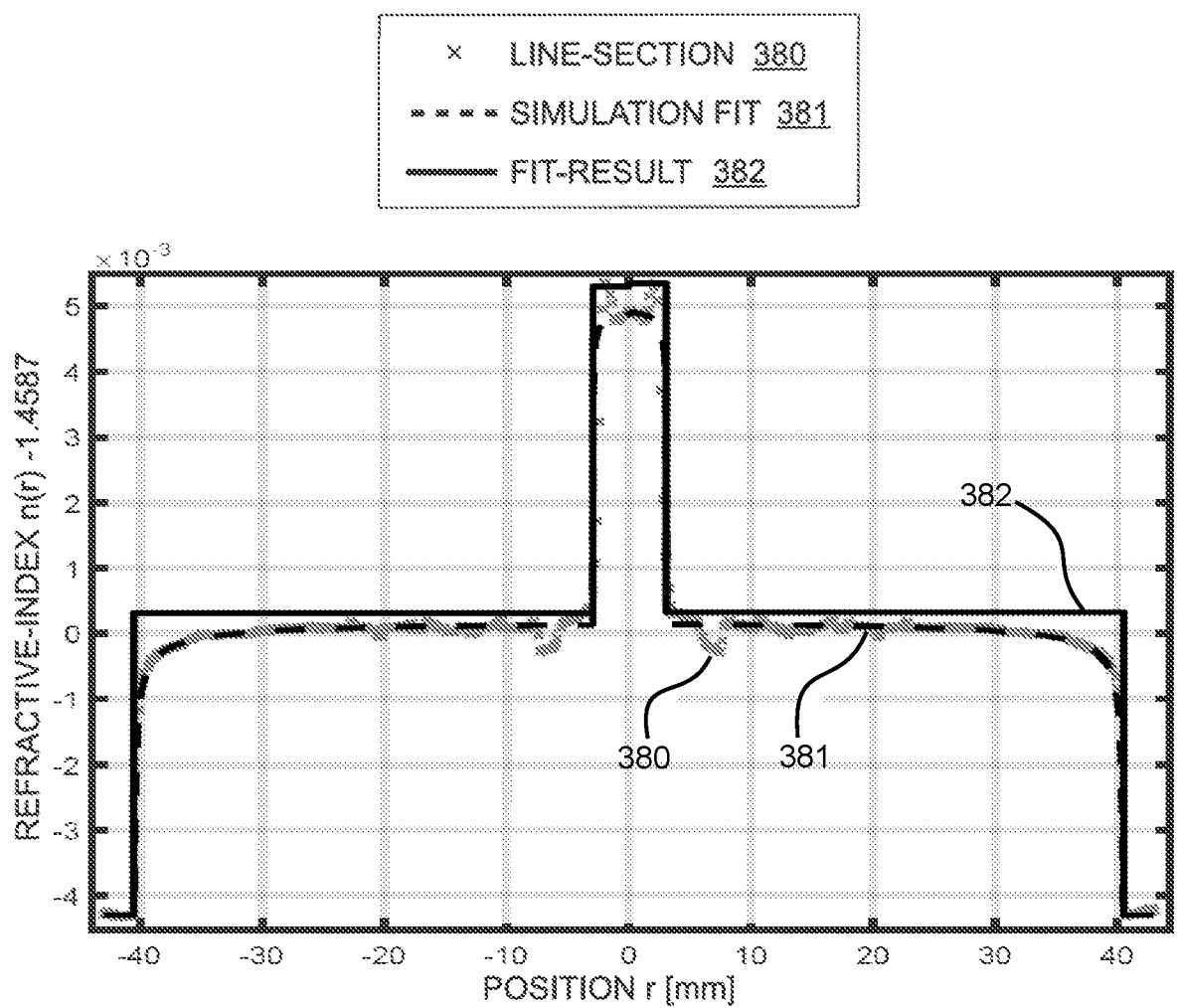

Data taken along the longer line section 372 drawn through the center core of the diagram of FIG. 22 are presented in the graph of FIG. 23, illustrating the line section fitting procedure. The graph plots the relative refractive index n(r)−1.4587 against the position r in millimeters. The graph of FIG. 23 includes three curves: a curve 380 through the measured line section data, the simulation fit curve 381, and the fit result (or assumed) curve 382. The graph shows the merits of the method 500. The Radon transform and its inverse can be applied to transition between the sinogram of FIG. 21 and the graph of FIG. 23.

Figure 24:
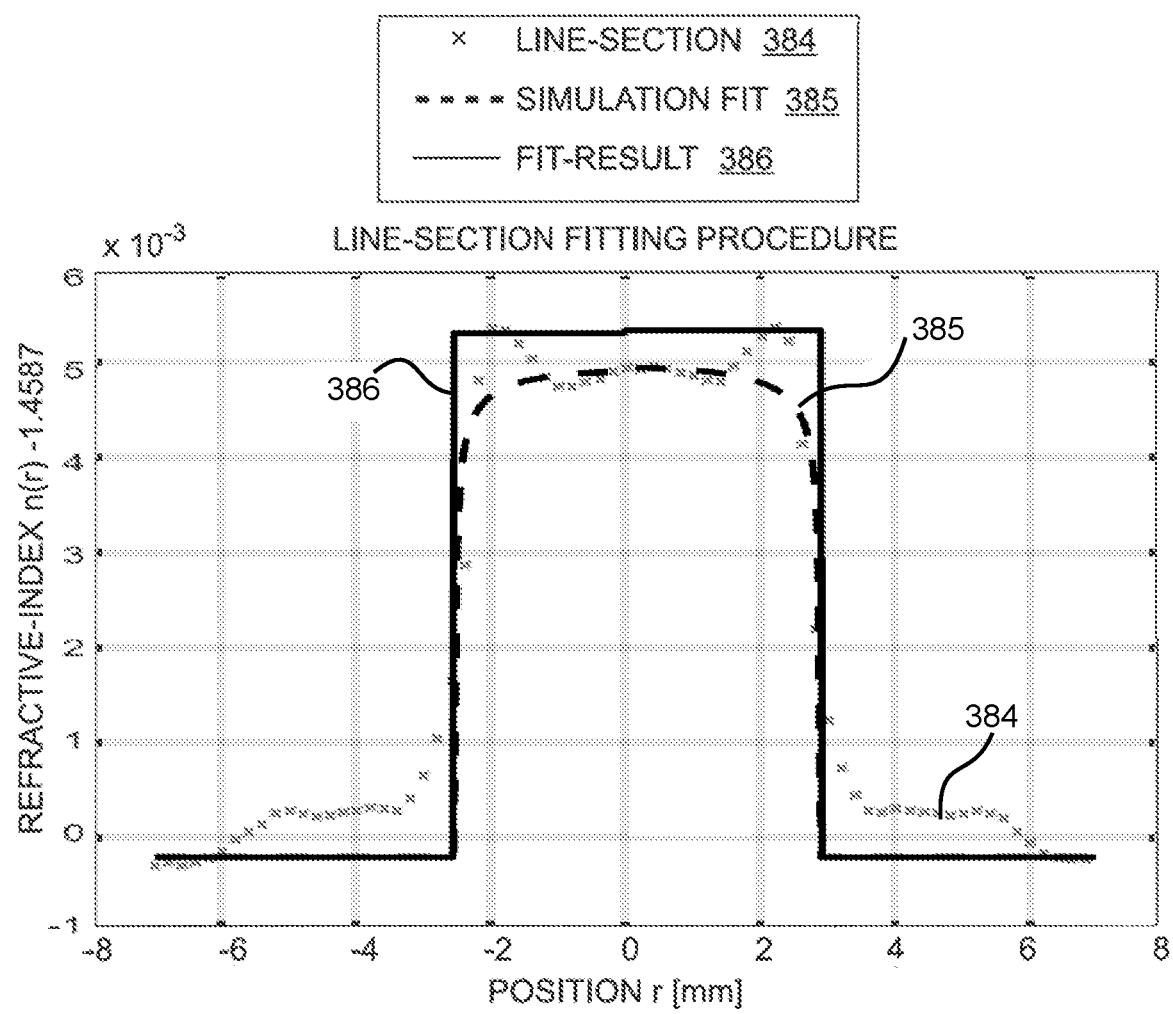

Data taken along the shorter line section 370 drawn through the center core of the diagram of FIG. 22 are presented in the graph of FIG. 24, illustrating the line section fitting procedure. The graph plots the relative refractive index n(r)−1.4587 against the position r in millimeters. The graph of FIG. 24 includes three curves: a curve 384 through the measured line section data, the simulation fit curve 385, and the fit result (or assumed) curve 386. The graph shows the merits of the method 500.

Figure 25:
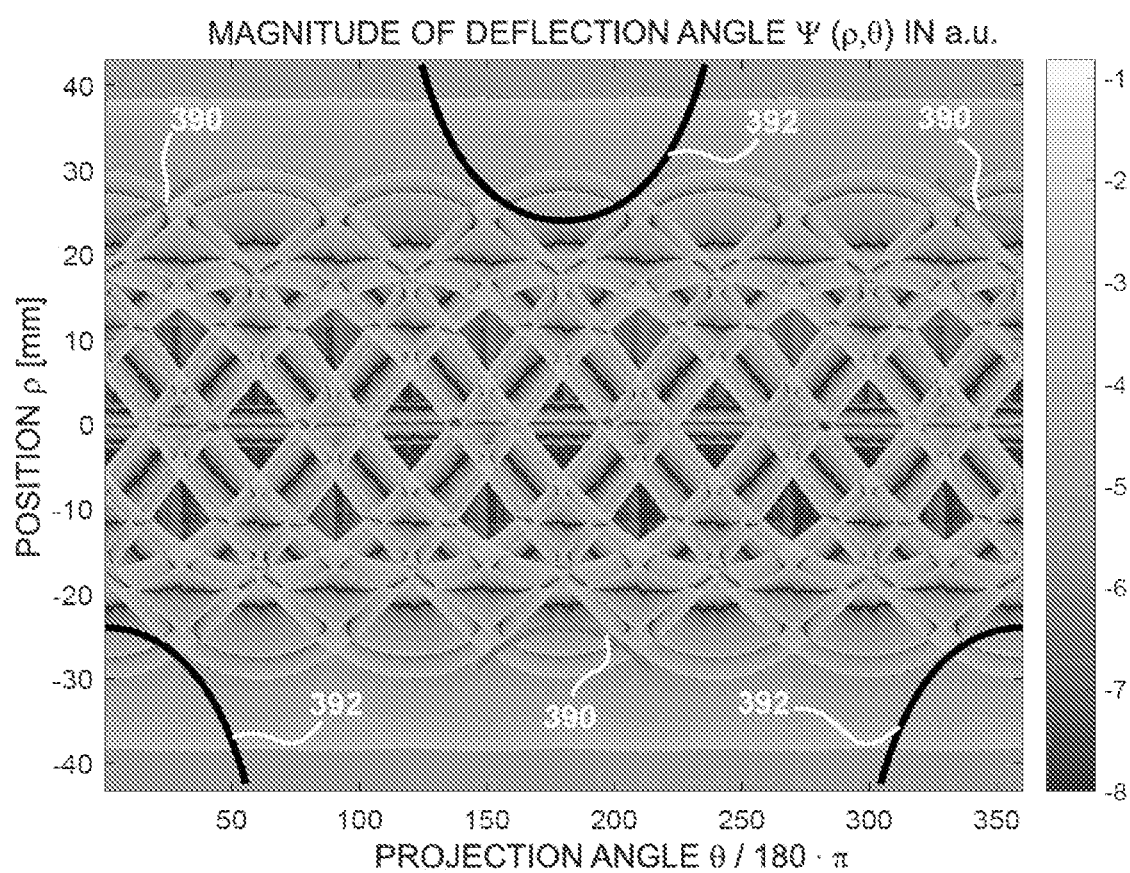
FIGS. 25-28 depict an example of applying an embodiment of the method of the present disclosure to a preform having six cores and, specifically.

FIGS. 25-28 depict Example 4 for a preform having six cores and without any center core. FIG. 25 is the sinogram created by applying the method 500, i.e., rotating the preform, taking measurements, and stacking the measurements left-to-right. Depicted are six sinusoidal wave shapes, one for each of the cores. Note the curved lines reflecting a first line section 390 and a second line section 392. The line sections 390, 392 shown in the sinogram of FIG. 25 appear curved because the line sections 390, 392 within the 2D RIP (see FIG. 26) do not go through the center. The sinogram shows the magnitude of the deflection angle distribution ψ(ρ, θ) in arbitrary units in the ρ-θ plane.

Figure 26:
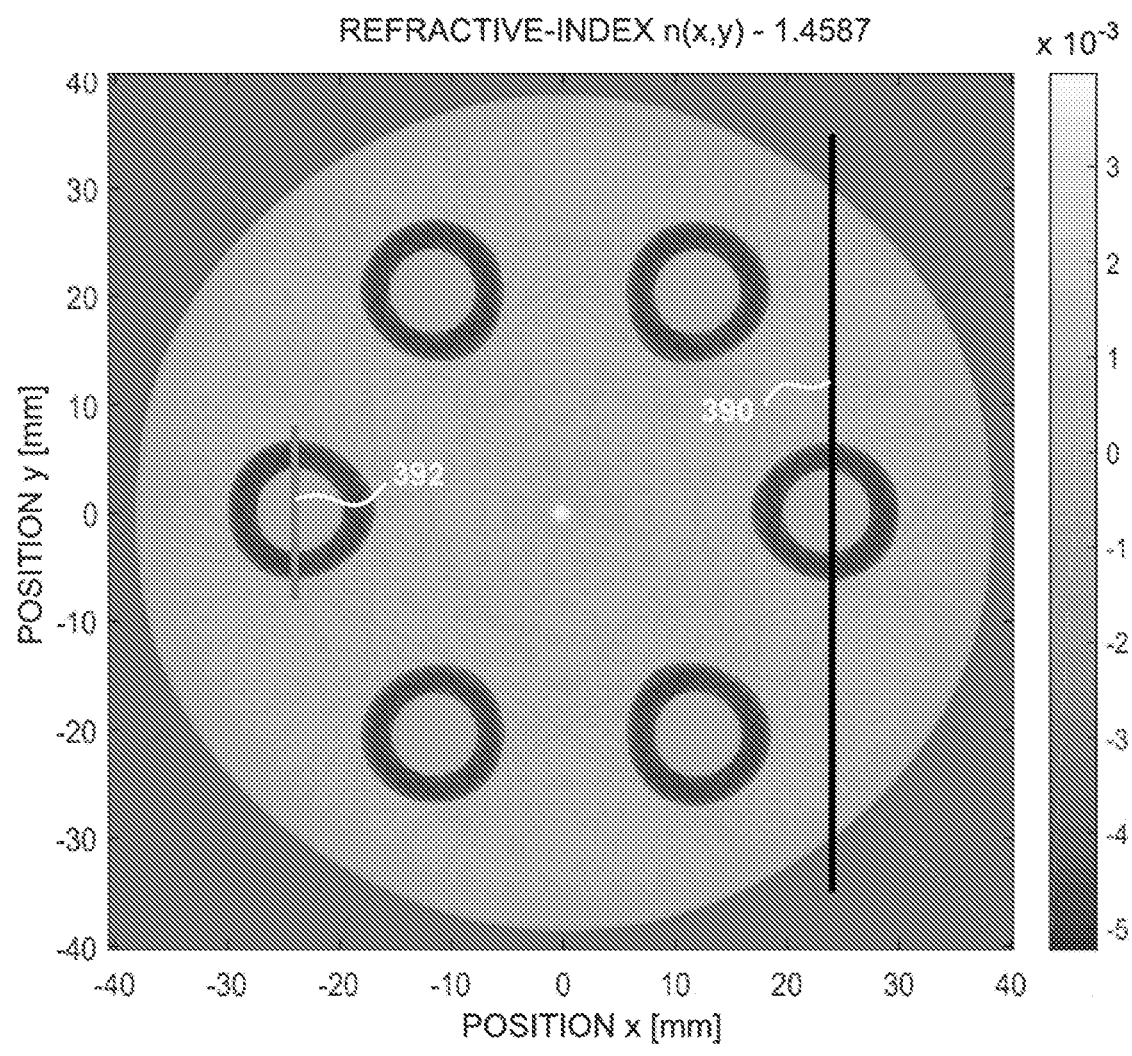

FIG. 26 is a diagram of the relative refractive index n(x, y)−1.4587 in the x-y plane, illustrating the reconstructed 2D RIP of the preform having six cores. The first line section 390 is a shorter line section taken through one of the cores. The second line section 392 is a longer line section taken through another of the cores but including the preform boundaries at around ±32 mm.

Figure 27:
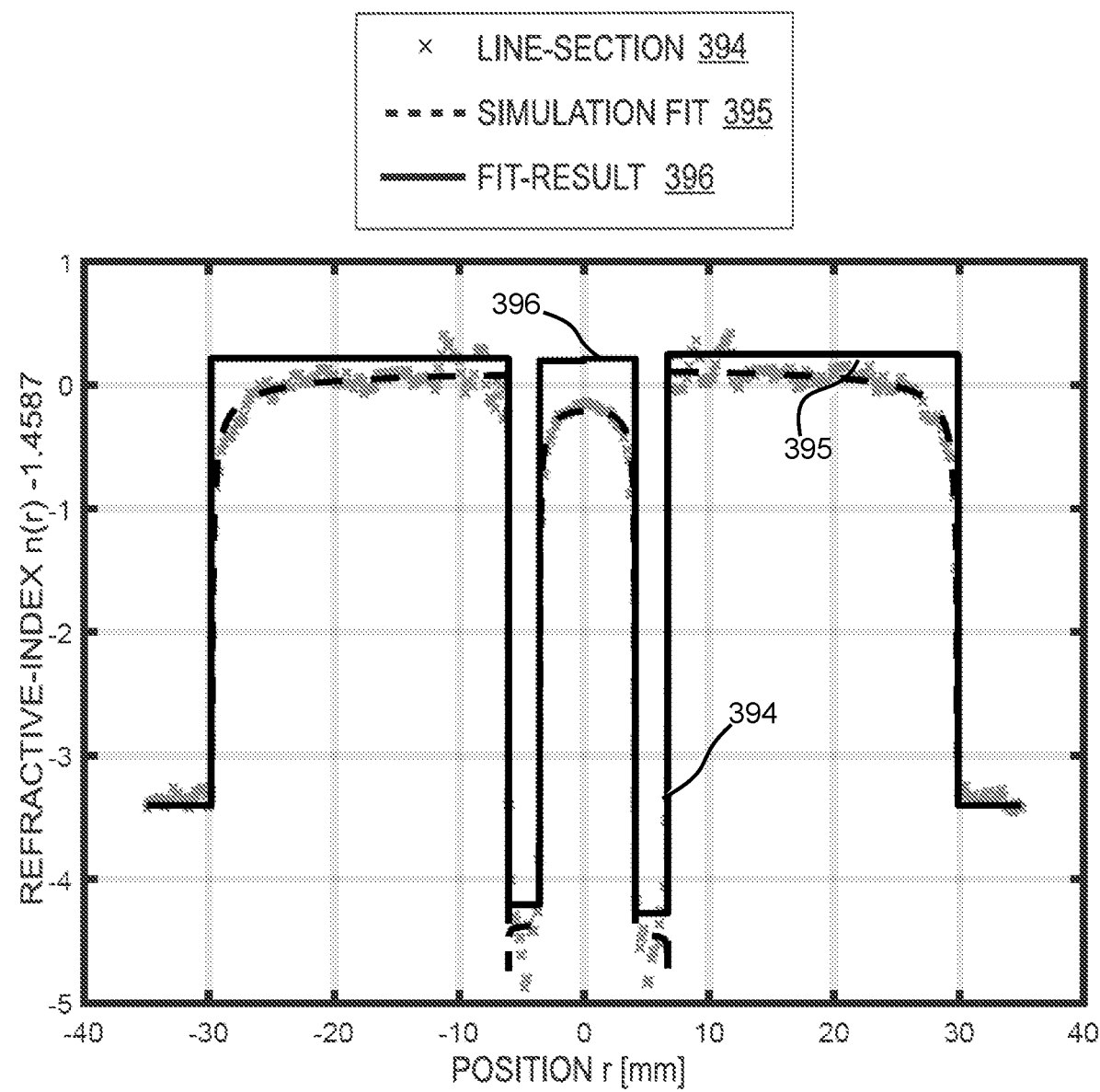

Data taken along the longer line section 392 are presented in the graph of FIG. 27, illustrating the line section fitting procedure. The graph plots the relative refractive index n(r)−1.4587 against the position r in millimeters. The graph of FIG. 27 includes three curves: a curve 394 through the measured line section data, the simulation fit curve 395, and the fit result (or assumed) curve 396. The graph shows the merits of the method 500.

Figure 28:
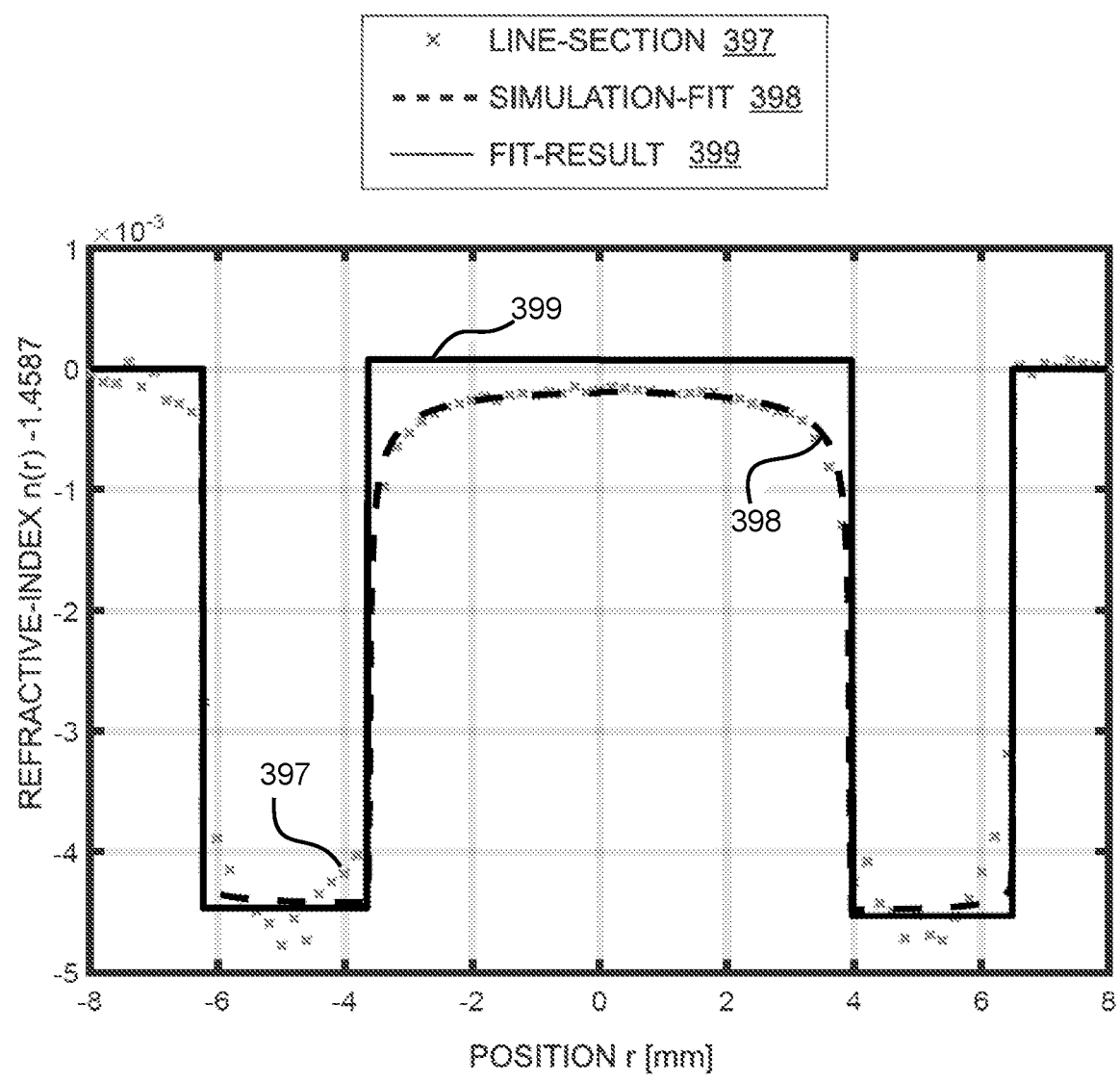

Data taken along the shorter line section 390 are presented in the graph of FIG. 28, illustrating the line section fitting procedure. The graph plots the relative refractive index n(r)−1.4587 against the position r in millimeters. The graph of FIG. 28 includes three curves: a curve 397 through the measured line section data, the simulation fit curve 398, and the fit result (or assumed) curve 399. The graph shows the merits of the method 500.

The examples show that the calculated preform parameters, especially the refractive index steps, are much more accurate with the method 500. The method 500 is beneficial for customers of non-symmetrical preforms, including multicore preforms, hollow core fiber preforms, Panda-preforms, or preforms for fiber lasers with non-circular interfaces.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges.

What is claimed:

1. A method for determining a refractive index profile (RIP) of an object, the method comprising:
    (a) providing the object, the object including an optical object which has a longitudinal axis around which at least one layer extends outwardly wherein the at least one layer lacks a complete rotational symmetry in cross section;
    (b) scanning the object with a light beam, starting with a first projection angle, and creating raw data representing the object through measured data;
    (c) optionally rotating the object and repeating step (b) iteratively until all projection angles have been scanned and all measured data have been created;

(d) processing the measured data to form a sinogram and, if the optional step (c) has been completed, proceeding to step (f);

(e) rotating the object and repeating steps (b) and (d) iteratively until all projection angles have been scanned;

(f) calculating a 2D RIP from the sinogram;

(g) determining whether an RIP measurement artifact is present in the 2D RIP;

(h) selecting a line section of interest within the 2D RIP to correct the RIP measurement artifact;

(i) applying a fitting procedure to the line section of interest; and (j) determining refractive index steps/gradients and dimensions.

2. The method according to claim 1, wherein the step (b) of scanning the object includes directing an entry beam at an entry point into the cylindrical optical object in a direction transverse to the cylinder longitudinal axis, wherein a deflection angle $\psi$ is defined as the angle between an exit beam relative to the entry beam, and y is the distance between the cylinder longitudinal axis and the entry point of the entry beam in a Cartesian coordinate system.

3. The method according to claim 1, wherein the step of calculating the 2D RIP is carried out on the basis of an inverse Radon transformation.

4. The method according to claim 1, wherein the step of processing the measured data to form a sinogram includes calculating a deflection function, calculating a phase-shift diagram, and stacking the phase-shift diagram to form the sinogram.

5. The method according to claim 1, wherein the raw data includes a raw image and the method further comprises the step of improving the quality of the raw image by one or more of using a scanning camera that has an "Image ROI" feature, gathering several images with different exposures, using a scanning camera with HDR, and removing OVD-diffractions using a filtering algorithm.

6. The method according to claim 1, further comprising the step of improving the quality of the sinogram by one or more of applying a radii-run-out correction and interpolating the sinogram to a fine mesh.

7. The method according to claim 1, wherein the object provided in step (a) is a fiber preform.

8. The method according to claim 7, further comprising the step of using the determined refractive index steps/gradients and dimensions to characterize the fiber preform and adapt a preform manufacturing process.

9. The method according to claim 1, further comprising the step, before the step (f), of determining whether all projection angles have been scanned.

10. The method according to claim 1, further comprising if not if no RIP measurement artifact is present in the 2D RIP, determining geometries and refractive index steps and concluding the method.

11. The method according to claim 1, wherein the step (i) of applying the fitting procedure to the selected line section of interest includes extracting start parameters for the fitting procedure from the line section, defining a first fitting region, and determining whether an actual layer is step-like.

12. The method according to claim 11, wherein the fitting procedure further includes, if the actual layer is step-like, generating an analytical deflection curve, transforming the analytical deflection curve to a deflection RIP, and calculating the accuracy of the deflection RIP compared with the initial line section.

13. The method according to claim 1, further comprising, after the step (j), the step (k) of determining whether all line sections of interest within the 2D RIP have been characterized.

14. The method according to claim 13, further comprising repeating steps (h), (i), (j), and (k) iteratively until all line sections of interest within the 2D RIP have been characterized.

15. The method according to claim 14, further comprising calculating a measurement artifact compensated refractive index profile for the object.

* * * * *